US012737038B2

(12) United States Patent
Xu

(10) Patent No.: US 12,737,038 B2
(45) **Date of Patent: *Sep. 15, 2026**

(54) USER INTERFACE MECHANISMS FOR PREDICTION ERROR RECOVERY

(71) Applicant: Meta Platforms Technologies, LLC, Menlo Park, CA (US)

(72) Inventor: Yan Xu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/227,178

(22) Filed: Jun. 3, 2025

(65) Prior Publication Data

US 2025/0362737 A1 Nov. 27, 2025

Related U.S. Application Data

(63) Continuation of application No. 18/446,997, filed on Aug. 9, 2023, now Pat. No. 12,321,510.
(Continued)

(51) Int. Cl.
*G06F 3/01* (2006.01)
*G06F 3/0482* (2013.01)
(Continued)

(52) U.S. Cl.
CPC ............ *G06F 3/011* (2013.01); *G06F 3/0482* (2013.01); *G06V 10/42* (2022.01); *G06V 40/20* (2022.01);
(Continued)

(58) Field of Classification Search
CPC ........ G06F 3/011; G06F 3/0482; G06F 1/163; G06F 3/013; G06F 3/014; G06F 3/016;
(Continued)

(56) References Cited

U.S. PATENT DOCUMENTS

| | | | |
|---|---|---|---|
| 11,385,789 B1 * | 7/2022 | Skovsgaard | ............ G06F 3/016 |
| 12,321,510 B2 * | 6/2025 | Xu | ..................... G06V 10/7788 |
| 2021/0294940 A1 | 9/2021 | Dodd | |

OTHER PUBLICATIONS

Final Office Action mailed Oct. 31, 2024 for U.S. Appl. No. 18/446,997, filed Aug. 9, 2023, 25 pages.

(Continued)

*Primary Examiner* — Matthew A Eason
*Assistant Examiner* — Chayce R Bibbee
(74) *Attorney, Agent, or Firm* — Morgan, Lewis & Bockius LLP

(57) ABSTRACT

The present disclosure relates to techniques for using interface mechanisms to recover from inaccurate predictions. One example method includes obtaining input data including user activity data and determining a recommendation for a user. The recommendation is based on the input data and historical activity data of a plurality of users. The method includes generating a user interface (UI) including selectable UI elements. In accordance with a determination that the recommendation satisfies a first confidence threshold, the selectable UI elements includes a first set of selectable UI elements. Alternatively, in accordance with a determination that the recommendation satisfies a second confidence threshold, the selectable UI elements includes a second set of selectable UI elements. The method further includes causing a display of the head-mounted device to present the UI and the recommendation and, at least, the first set of selectable UI elements or the second set of selectable UI elements.

20 Claims, 12 Drawing Sheets

Related U.S. Application Data

(60) Provisional application No. 63/370,939, filed on Aug. 10, 2022.

(51) Int. Cl.
*G06V 10/42* (2022.01)
*G06V 40/20* (2022.01)
*H04N 13/344* (2018.01)
*H04N 13/398* (2018.01)

(52) U.S. Cl.
CPC ......... *H04N 13/344* (2018.05); *H04N 13/398* (2018.05)

(58) Field of Classification Search
CPC ..... G06F 3/04847; G06F 3/167; G06V 10/42; G06V 40/20; G06V 10/7788; G06V 10/94; G06V 20/20; H04N 13/344; H04N 13/398
See application file for complete search history.

(56) References Cited

OTHER PUBLICATIONS

Non-Final Office Action mailed Mar. 15, 2024 for U.S. Appl. No. 18/446,997, filed Aug. 9, 2023, 24 pages.
Notice of Allowance mailed Feb. 12, 2025 for U.S. Appl. No. 18/446,997, filed Aug. 9, 2023, 12 pages.

* cited by examiner

USER INTERFACE MECHANISMS FOR PREDICTION ERROR RECOVERY

CROSS-REFERENCE TO RELATED APPLICATION

The present application is continuation application of U.S. patent application Ser. No. 18/446,997, filed Aug. 9, 2023, titled "User Interface Mechanisms For Prediction Error Recovery," which claims the benefit and priority under 35 U.S.C. 119(e) of U.S. Provisional Application No. 63/370,939, filed Aug. 10, 2022, the entire contents of which is incorporated herein by reference for all purposes.

FIELD

The present disclosure relates generally to error recovery in an extended reality environment, and more particularly, to techniques for using interface mechanisms to recover from inaccurate predictions (i.e., error recovery).

BACKGROUND

A virtual assistant is an artificial intelligence (AI) enabled software agent that can perform tasks or services including: answer questions, provide information, play media, and provide an intuitive interface for connected devices such as smart home devices, for an individual based on voice or text utterances (e.g., commands or questions). Conventional virtual assistants process the words a user speaks or types and converts them into digital data that the software can analyze. The software uses a speech and/or text recognition-algorithm to find the most likely answer, solution to a problem, information, or command for a given task. As the number of utterances increase, the software learns over time what users want when they provide various utterances. This helps improve the reliability and speed of responses and services. In addition to their self-learning ability, their customizable features and scalability have led virtual assistants to gain popularity across various domain spaces including website chat, computing devices such as smart phones and automobiles, and as standalone passive listening devices.

Even though virtual assistants have proven to be a powerful tool, these domain spaces have proven to be an inappropriate venue for such a tool. The virtual assistant will continue to be an integral part in these domain spaces but will always likely be viewed as a complementary feature or limited use case, but not a crucial must have feature. Which is why more recently, developers have been looking for a better suited domain space for deploying virtual assistants. That domain space is extended reality. Extended reality is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more viewers.

However, extended reality headsets and devices are limited in the way users interact with applications. Some provide hand controllers, but controllers betray the point of freeing the user's hands and limit the use of extended reality headsets. Others have developed sophisticated hand gestures for interacting with the components of extended reality applications. Hand gestures are a good medium, but they have their limits. For example, given the limited field of view that extended reality headsets have, hand gestures require users to keep their arms extended so that they enter the active area of the headset's sensors. This can cause fatigue and again limit the use of the headset. This is why virtual assistants have become important as a new interface for extended reality devices such as headsets. Virtual assistants can easily blend in with all the other features that the extended reality devices provide to their users. Virtual assistants can help users accomplish tasks with their extended reality devices that previously required controller input or hand gestures on or in view of the extended reality devices. Users can use virtual assistants to open and close applications, activate features, or interact with virtual objects. When combined with other technologies such as eye tracking, virtual assistants can become even more useful. For instance, users can query for information about the object they're staring at, or ask the virtual assistant to revolve, move, or manipulate a virtual object without using gestures.

BRIEF SUMMARY

Techniques disclosed herein relate generally to error recovery in an extended reality environment. More specifically and without limitation, techniques disclosed herein relate to using interface mechanisms to recover from inaccurate predictions made by artificial intelligence such as predictions provided by a virtual assistant to a user as recommendations.

In various embodiments, an extended reality system is provided that includes: a head-mounted device comprising a display to display content to a user and one or more sensors that capture input comprising images of a visual field of the user wearing the head-mounted device, one or more processors, and one or more memories accessible to the one or more processors, the one or more memories storing a plurality of instructions executable by the one or more processors, the plurality of instructions comprising instructions that, when executed by the one or more processors, cause the one or more processors to perform processing comprising: collecting, using the one or more cameras, input data from the user that includes characteristics of activities performed by the user; extracting features from the input data, wherein the features include: (i) one or more conditions, (ii) one or more actions, (iii) connections between the one or more events, conditions, and actions, or (iv) any combination thereof; predicting a recommendation for the user based on the features and model parameters learned from historical activities performed by one or more users; generating a user interface comprising one or more graphical user interface elements configured to enable the user to recovery from the recommendation when the recommendation is inaccurate, wherein the one or more graphical user interface elements provide selectable options including an option to generate a new recommendation, modify the recommendation, or a combination thereof; rendering the recommendation and the user interface on the display; receiving a request from the user via the user interface to recovery from the inaccurate recommendation, wherein the request includes selection of the option to generate the new recommendation, modify the recommendation, or the combination thereof; generating a response based on the received request from the user, wherein the response includes the new recommendation, a modified recommendation, or a combination thereof, and rendering the response to the user via the user interface on the display.

In some embodiments, the input data includes: (i) data regarding activity of the user in an extended reality environment, (ii) data from external systems, or (iii) both.

In some embodiments, the processing further comprises generating embeddings for the features, and the recommendation is predicted for the user based on the embeddings and the model parameters learned from the historical activities performed by the one or more users.

In some embodiments, the one or more graphical user interface elements are configured to request refreshing the recommendation by making a prediction of the new recommendation based on updated input data, the request includes selection of the option to generate the new recommendation, and in response to receiving the request for the refreshing, the processing further comprises: collecting, using the one or more cameras, the updated input data from the user that includes characteristics of updated activities performed by the user; extracting updated features from the updated input data, wherein the updated features include: (i) one or more conditions, (ii) one or more actions, (iii) connections between the one or more events, conditions, and actions, or (iv) any combination thereof; predicting the new recommendation for the user based on the updated features and the model parameters; and rendering the new recommendation on the display.

In some embodiments, the one or more graphical user interface elements are configured to request modifying the recommendation, the request includes selection of the option to modify the recommendation and an alternative recommendation, and in response to receiving the request for the modifying, the processing further comprises: rendering the alternative recommendation on the display.

In some embodiments, the one or more graphical user interface elements are configured to request modifying and refreshing the recommendation by making a prediction of the new recommendation based on explicit input data, the request includes selection of the option to modify and refresh the recommendation, and in response to receiving the request for the modifying and refreshing, the processing further comprises: collecting, using the one or more cameras, the explicit input data from the user that includes characteristics of updated activities performed by the user that are performed explicitly for generating a new recommendation; extracting explicit features from the explicit input data, wherein the explicit features include: (i) one or more conditions, (ii) one or more actions, (iii) connections between the one or more events, conditions, and actions, or (iv) any combination thereof; predicting the new recommendation for the user based on the explicit features and the model parameters; and rendering the new recommendation on the display.

In some embodiments, the processing further comprises in response to receiving the request for the modifying and refreshing, rendering one or more hints to the user on the display, wherein the one or more hints are generated as information to teach the user how they may improve the accuracy of the recommendation, and the explicit input data from the user is collected from the updated activities performed by the user based on the one or more hints.

In some embodiments, the user interface is generated based on preferences of the user.

In some embodiments, the user interface is generated based on confidence of the recommendation and one or more confidence thresholds.

In some embodiments, the request and the response are used to update the model parameters.

Some embodiments of the present disclosure include a computer-implemented method comprising steps to perform part or all of one or more methods and/or part or all of one or more processes disclosed herein. Some embodiments of the present disclosure include one or more non-transitory computer-readable media storing computer-readable instructions that, when executed by one or more processing systems, cause the one or more processing systems to perform operations to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
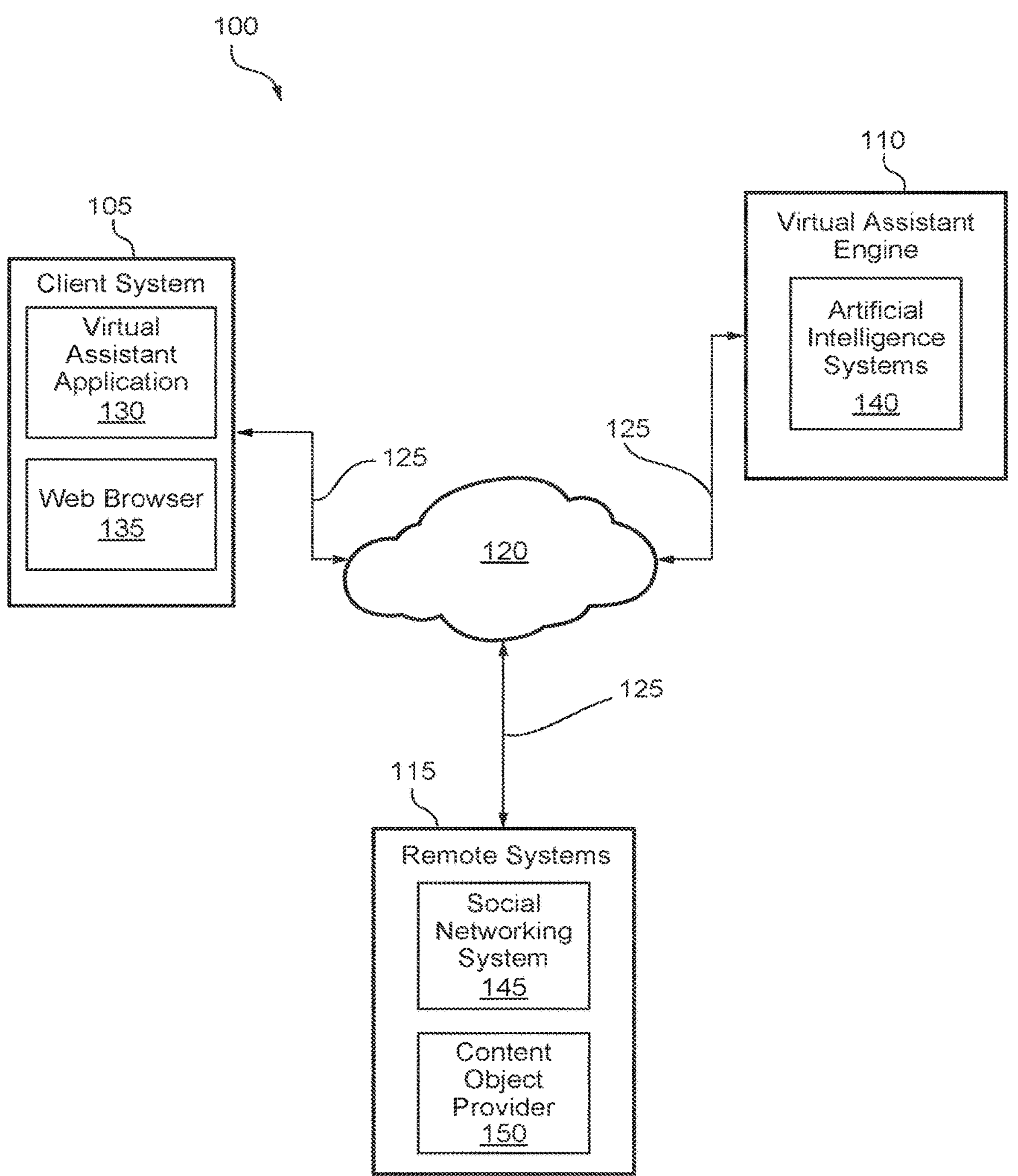
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Extended reality systems are becoming increasingly ubiquitous with applications in many fields, such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted device (HMD) worn by a user and configured to output extended reality content to the user. The extended reality content may be generated in a wholly or partially simulated environment (extended reality environment) that people sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment is a simulated environment in which a virtual or computer-generated environment incorporates one or more sensory inputs from the physical environment. In any instance, during operation in a VR, MR, AR, or AV environment, the user typically interacts with and within the extended reality system to interact with extended reality content.

In many activities undertaken via VR, MR, AR, or AV, users freely roam through simulated and physical environments and are provided with content that contains information that may be important and/or relevant to a user's experience within the simulated and physical environments. Machine learning, artificial intelligence, computer vision and other advanced form of automation associated with the extended reality systems are more and more integrated in every day tasks with the promise to reduce workload and improve productivity. For example, an extended reality system may assist a user with performance of a task in simulated and physical environments by providing them with content such as information about their environment, recommendations on various actions or tasks available, and instructions for performing the actions or tasks. However, accurate automation such as predicted recommendations is difficult to perform perfectly and some amount of inaccuracy is virtually unavoidable. Even if rare, errors can cause great frustration if users do not have sufficient leverage to rectify and fix the result. For example, using a virtual assistant for some tasks can feel poor, even when speech recognition quality and/or object detection is reasonably high. A possible reason is that even a single inaccurate recommendation such as predicted text or predicted products for purchase requires irritatingly tedious manual edits of the text or scrolling through hundreds of products to find what we are truly interested in purchasing.

When faced with inaccurate results, users have essentially three rectification options: (1) try the automation again hoping for a better result ("auto" approach); (2) try to fix the result themselves using a user interface ("manual"); or (3) a combination of both ("mixed"). This decision is typically influenced by how much control a user interface provides to manipulate the task result, including its usability. This is typically referred to as "controllability" of the automated task, and its relationship with prediction accuracy of the automated system has been studied. Essentially studies have shown that, even with low accuracy, self-reported satisfaction has been shown to remain constant for high controllability conditions, and vice versa. Satisfaction increases with both accuracy and controllability on the rest of the range. In fact, a strong preference for manual control has been observed, even under very poor controllability and high accuracy conditions. Nonetheless, many automated systems are developed to minimize user interaction (i.e., controllability) and user integrated systems are typically viewed as a failure of automation.

In order to overcome these and other challenges, techniques are disclosed herein for user interface mechanism that more easily facilitate user control of the automation and allow for recovery from automated errors (e.g., inaccurate predictions or recommendations) while minimizing user irritation that an error occurred. In exemplary embodiments, an extended reality system is provided that includes: a head-mounted device comprising a display to display content to a user and one or more cameras to capture images of a visual field of the user wearing the head-mounted device, one or more processors, and one or more memories accessible to the one or more processors, the one or more memories storing a plurality of instructions executable by the one or more processors, the plurality of instructions comprising instructions that when executed by the one or more processors cause the one or more processors to perform processing comprising: collecting, using the one or more cameras, input data from the user that includes characteristics of activities performed by the user; extracting features from the input data, wherein the features include: (i) one or more conditions, (ii) one or more actions, (iii) connections between the one or more events, conditions, and actions, or (iv) any combination thereof; predicting a recommendation for the user based on the features and model parameters learned from historical activities performed by one or more users; generating a user interface comprising one or more graphical user interface elements configured to enable the user to recovery from the recommendation when the recommendation is inaccurate, wherein the one or more graphical user interface elements provide selectable options including an option to generate a new recommendation, modify the recommendation, or a combination thereof; rendering the recommendation and the user interface on the display; receiving a request from the user via the user interface to recovery from the inaccurate recommendation, wherein the request includes selection of the option to generate the new recommendation, modify the recommendation, or the combination thereof; generating a response based on the received request from the user, wherein the respond includes the new recommendation, a modified recommendation, or a combination thereof, and rendering the response to the user via the user interface on the display.

Extended Reality System Overview

FIG. 1 illustrates an example network environment 100 associated with an extended reality system in accordance with aspects of the present disclosure. Network environment 100 includes a client system 105, a virtual assistant engine 110, and remote systems 115 connected to each other by a network 120. Although FIG. 1 illustrates a particular arrangement of the client system 105, the virtual assistant engine 110, the remote systems 115, and the network 120, this disclosure contemplates any suitable arrangement. As an example, and not by way of limitation, two or more of the client system 105, the virtual assistant engine 110, and the remote systems 115 may be connected to each other directly, bypassing the network 120. As another example, two or more of the client system 105, the virtual assistant engine 110, and the remote systems 115 may be physically or logically co-located with each other in whole or in part. Moreover, although FIG. 1 illustrates a particular number of the client system 105, the virtual assistant engine 110, the remote systems 115, and the network 120, this disclosure contemplates any suitable number of client systems 105, virtual assistant engine 110, remote systems 115, and networks 120. As an example, and not by way of limitation, network environment 100 may include multiple client systems, such as client system 105; virtual assistant engines, such as virtual assistant engine 110; remote systems, such as remote systems 115; and networks, such as network 120.

This disclosure contemplates that network 120 may be any suitable network. As an example, and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Additionally, the network 120 may include one or more networks.

Links 125 may connect the client system 105, the virtual assistant engine 110, and the remote systems 115 to the network 120, to another communication network (not shown), or to each other. This disclosure contemplates links 125 may include any number and type of suitable links. In particular embodiments, one or more of the links 125 include one or more wireline links (e.g., Digital Subscriber Line or Data Over Cable Service Interface Specification), wireless links (e.g., Wi-Fi or Worldwide Interoperability for Microwave Access), or optical links (e.g., Synchronous Optical Network or Synchronous Digital Hierarchy). In particular embodiments, each link of the links 125 includes an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links. Links 125 need not necessarily be the same throughout a network environment 100. For example, some links of the links 125 may differ in one or more respects from some other links of the links 125.

In various embodiments, the client system 105 is an electronic device including hardware, software, or embedded logic components or a combination of two or more such components and capable of carrying out the appropriate extended reality functionalities in accordance with techniques of the disclosure. As an example, and not by way of limitation, the client system 105 may include a desktop computer, notebook or laptop computer, netbook, a tablet computer, e-book reader, GPS device, camera, personal digital assistant, handheld electronic device, cellular telephone, smartphone, a VR, MR, AR, or AV headset or HMD, any suitable electronic device capable of displaying extended reality content, or any suitable combination thereof. In particular embodiments, the client system 105 is a VR/AR HMD, such as described in detail with respect to FIG. 1. This disclosure contemplates any suitable client system 105 that is configured to generate and output extended reality content to the user. The client system 105 may enable its user to communicate with other users at other client systems.

In various embodiments, the client system 105 includes a virtual assistant application 130. The virtual assistant application 130 instantiates at least a portion of a virtual assistant, which can provide information or services to a user based on user input, contextual awareness (such as clues from the physical environment or clues from user behavior), and the capability to access information from a variety of online sources (such as weather conditions, traffic information, news, stock prices, user schedules, and/or retail prices). As used herein, when an action is "based on" something, this means the action is based at least in part on at least a part of the something. The user input may include text (e.g., online chat), especially in an instant messaging application or other applications, voice, eye-tracking, user motion, such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), provide goal assisted services (e.g., generating and implementing a recipe to cook a meal in a certain amount of time, implementing tasks to clean in a most efficient manner, generating and executing a construction plan including allocation of tasks to two or more workers, and the like), or combinations thereof. The virtual assistant may also perform management or data-handling tasks based on online information and events without user initiation or interaction. Examples of those tasks that may be performed by the virtual assistant may include schedule management (e.g., sending an alert to a dinner date to which a user is running late due to traffic conditions, updating schedules for both parties, and changing the restaurant reservation time). The virtual assistant may be enabled in an extended reality environment by a combination of the client system 105, the virtual assistant engine 110, application programming interfaces (APIs), and the proliferation of applications on user devices, such as the remote systems 115.

A user at the client system 105 may use the virtual assistant application 130 to interact with the virtual assistant engine 110. In some instances, the virtual assistant application 130 is a stand-alone application or integrated into another application, such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input, such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, and/or sensors. The virtual assistant application 130 communicates the input to the virtual assistant engine 110. Based on the input, the virtual assistant engine 110 analyzes the input and generates responses (e.g., text or audio responses, device commands, such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities, such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via a remote systems 115). The virtual assistant application 130 may communicate the request for traffic information to virtual assistant engine 110. The virtual assistant engine 110 may accordingly contact a third-party systems and retrieve traffic information as a result of the request and send the traffic information back to the virtual assistant application 130. The virtual assistant application 130 may then present the traffic information to the user as text (e.g., as virtual content overlaid on the physical environment, such as real-world object) or audio (e.g., spoken to the user in natural language through a speaker associated with the client system 105).

In various embodiments, the virtual assistant engine 110 assists users to retrieve information from different sources, request services from different service providers, assist users to learn or complete goals and tasks using different sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. The goals may comprise, for example, things that a user wants to occur, such as a meal, a piece of furniture, a repaired automobile, a house, a garden, a clean apartment, and the like. The tasks may comprise, for example, cooking a meal using one or more recipes, building a piece of furniture, repairing a vehicle, building a house, planting a garden, cleaning one or more rooms of an apartment, and the like. Each goal and task may be associated with a workflow of actions or sub-tasks for performing the task and achieving the goal. For example, for preparing a salad, a workflow of actions or sub-tasks may comprise ingredients needed, any equipment needed for the steps (e.g., a knife, a stove top, a pan, a salad spinner), sub-tasks for preparing ingredients (e.g., chopping onions, cleaning lettuce, cooking chicken), and sub-tasks for combining ingredients into subcomponents (e.g., cooking chicken with olive oil and Italian seasonings).

The virtual assistant engine 110 may use AI systems 140 (e.g., rule-based systems or machine-learning based systems, such as natural-language understanding models) to analyze the input based on a user's profile and other relevant information. The result of the analysis may comprise different interactions associated with a task or goal of the user. The virtual assistant engine 110 may then retrieve information, request services, and/or generate instructions, recommendations, or virtual content associated with one or more of the different interactions for completing tasks or goals. In some instances, the virtual assistant engine 110 interacts with a remote systems 115, such as a social-networking system 145 when retrieving information, requesting service, and/or generating instructions or recommendations for the user. The virtual assistant engine 110 may generate virtual content for the user using various techniques, such as natural language generating, virtual object rendering, and the like. The virtual content may comprise, for example, the retrieved information; the status of the requested services; a virtual object, such as a glimmer overlaid on a physical object such as an appliance, light, or piece of exercise equipment; a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques. The functionality of the virtual assistant engine 110 is described in more detail with respect to FIGS. 5-7.

In various embodiments, a remote systems 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as user-profile data, concept-profile data, social-graph information, or other suitable data related to the online social network. The social-networking system 145 may be accessed by the other components of network environment 100 either directly or via a network 120. As an example, and not by way of limitation, the client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system via the network 120.

Remote systems 115 may include a content object provider 150. A content object provider 150 includes one or more sources of virtual content objects, which may be communicated to the client system 105. As an example, and not by way of limitation, virtual content objects may include information regarding things or activities of interest to the user, such as movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects, such as virtual interfaces, 2D or 3D graphics, media content, or other suitable virtual objects.

Figure 2A:
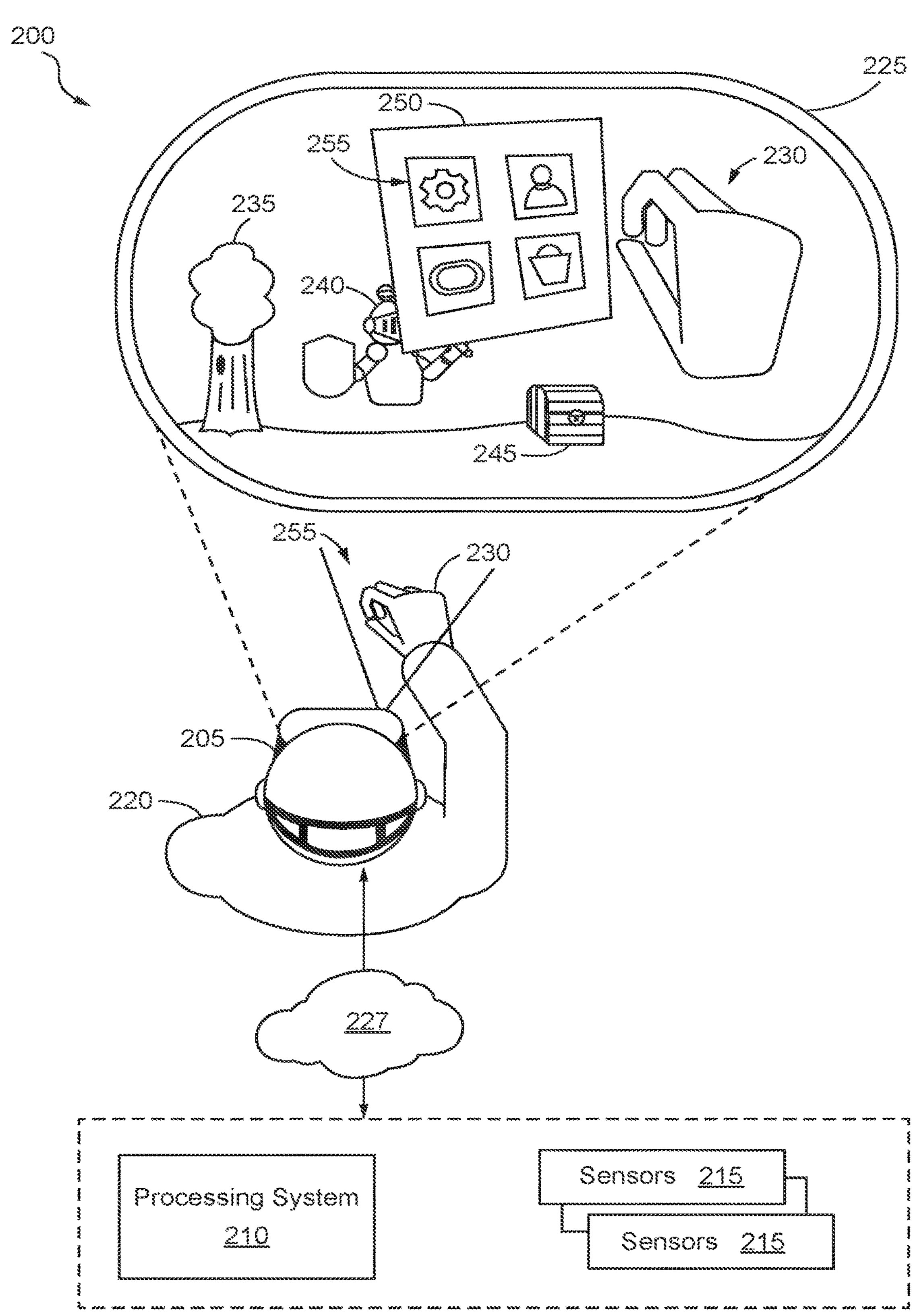
FIG. 2A is an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., an HMD), a processing system 210, and one or more sensors 215. As shown, extended reality system 205 is typically worn by user 220 and includes an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capturing devices (e.g., cameras, line scanners) for capturing images and other information of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD 205. Extended reality system 205, processing system 210, and the one or more sensors 215 are communicatively coupled via a network 227, which may be a wired or wireless network, such as Wi-Fi, a mesh network, or a short-range wireless communication medium, such as Bluetooth wireless technology, or a combination thereof. Although extended reality system 205 is shown in this example as in communication with, e.g., tethered to or in wireless communication with, the processing system 210, in some implementations, extended reality system 205 operates as a standalone, mobile extended reality system.

In general, client system 200 uses information captured from a real-world, physical environment to render extended reality content 225 for display to the user 220. In the example of FIG. 2A, the user 220 views the extended reality content 225 constructed and rendered by an extended reality application executing on processing system 210 and/or extended reality system 205. In some examples, the extended reality content 225 viewed through the extended reality system 205 includes a mixture of real-world imagery (e.g., the user's hand 230 and physical objects 235) and virtual imagery (e.g., virtual content, such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content, such as information or objects 240, 245 and virtual user interface 250) does not exist in the real-world, physical environment. Virtual user interface 250 may be fixed, as relative to the user 220, the user's hand 230, physical objects 235, or other virtual content, such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall, table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 200 may trigger generation and rendering of virtual content based on a current field of view of user 220, as may be determined by real-time gaze 265 tracking of the user, or other conditions. More specifically, image capture devices of the sensors 215 capture image data representative of objects in the real-world, physical environment that are within a field of view of image capture devices. During operation, the client system 200 performs object recognition within images captured by the image capturing devices of extended reality system 205 to identify objects in the physical environment, such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 that includes mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, or physical objects 235, that are within a field of view of the user 220. In other examples, the extended reality application may render images of real-world objects, such as the portions of the user 220, the user's hand 230, or physical objects 235, that are within a field of view along with virtual objects, such as virtual information or objects 240, 245 within extended reality content 225. In other examples, the extended reality application may render virtual representations of the portions of the user 220, the user's hand 230, and physical objects 235 that are within a field of view (e.g., render real-world objects as virtual objects) within extended reality content 225. In either example, user 220 is able to view the portions of the user 220, the user's hand 230, physical objects 235 and/or any other real-world objects or virtual content that are within a field of view within extended reality content 225. In other examples, the extended reality application may not render representations of the user 220 and the user's hand 230; the extended reality application may instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 200 may render a virtual user interface 250 having one or more virtual user interface elements at a position and orientation that are based on and correspond to the position and orientation of the user 220, the user's hand 230, physical objects 235, or other virtual content in the extended reality environment. For example, if a physical object is positioned in a vertical position on a table, the client system 200 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
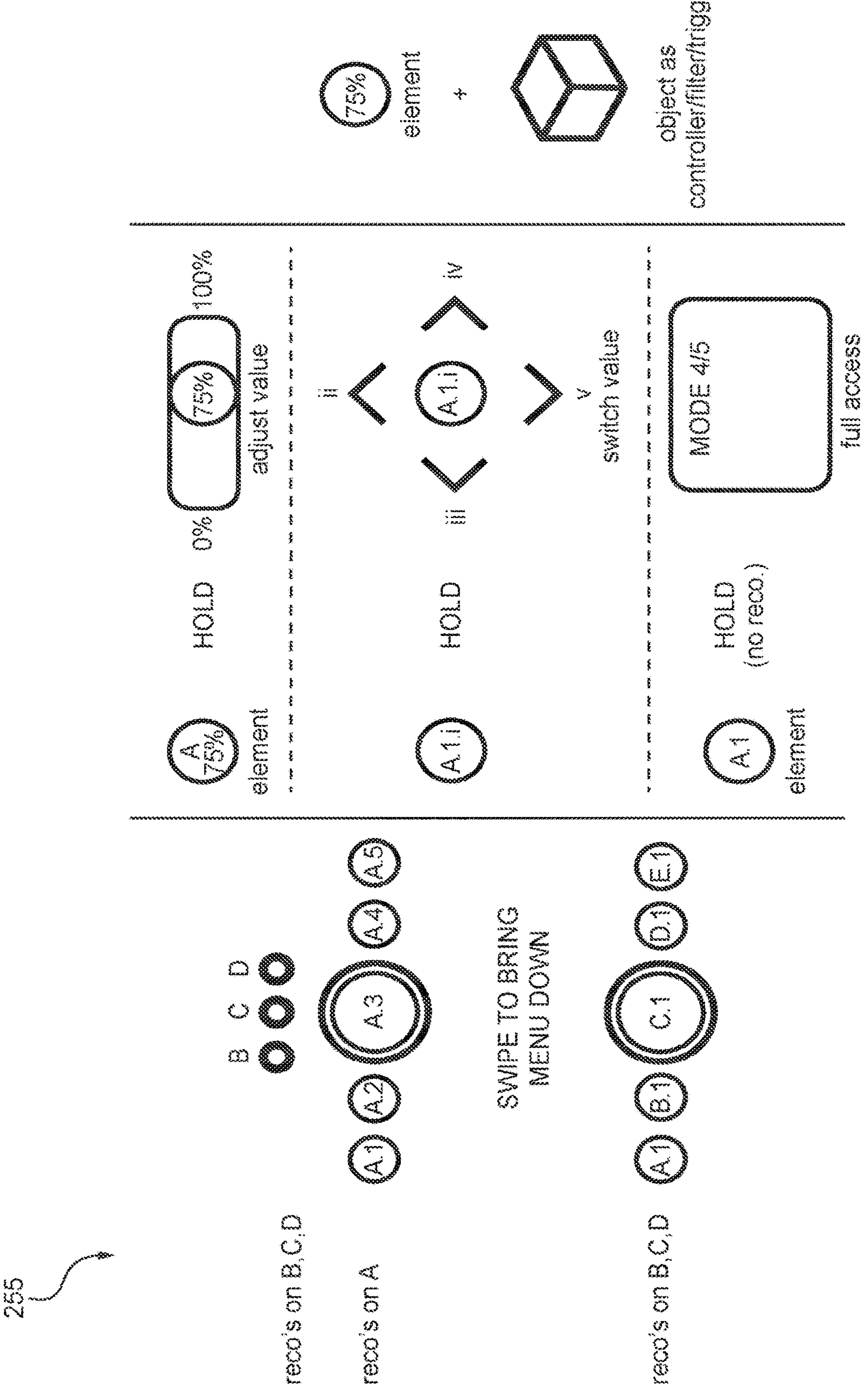
FIG. 2B is an illustration depicting user interface elements in accordance with various embodiments.

As shown in FIGS. 2A and 2B, virtual user interface 250 includes one or more virtual user interface elements. Virtual user interface elements may include, for instance, a virtual drawing interface; a selectable menu (e.g., a drop-down menu); virtual buttons, such as button element 255; a virtual slider or scroll bar; a directional pad; a keyboard; other user-selectable user interface elements including glyphs, display elements, content, user interface controls, and so forth. The particular virtual user interface elements for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements of virtual user interface 250, the client system 200 detects the gesture relative to the virtual user interface elements and performs an action associated with the gesture and the virtual user interface elements. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment, such as on a light switch or controller at which the client system 200 renders the virtual user interface button. In this example, the client system 200 detects this virtual button press gesture and performs an action corresponding to the detected press of a virtual user interface button (e.g., turns the light on). The client system 200 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 200 renders virtual user interface elements of virtual user interface 250. In this example, the client system 200 detects this gesture and performs an action according to the detected press and drag of virtual user interface elements, such as by moving a slider bar in the virtual environment. In this way, client system 200 simulates movement of virtual content using virtual user interface elements and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (e.g., stereo video that produces a three-dimensional (3D) effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (e.g., augmented reality system 300 in FIG. 3A) or that visually immerses a user in an extended reality (e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
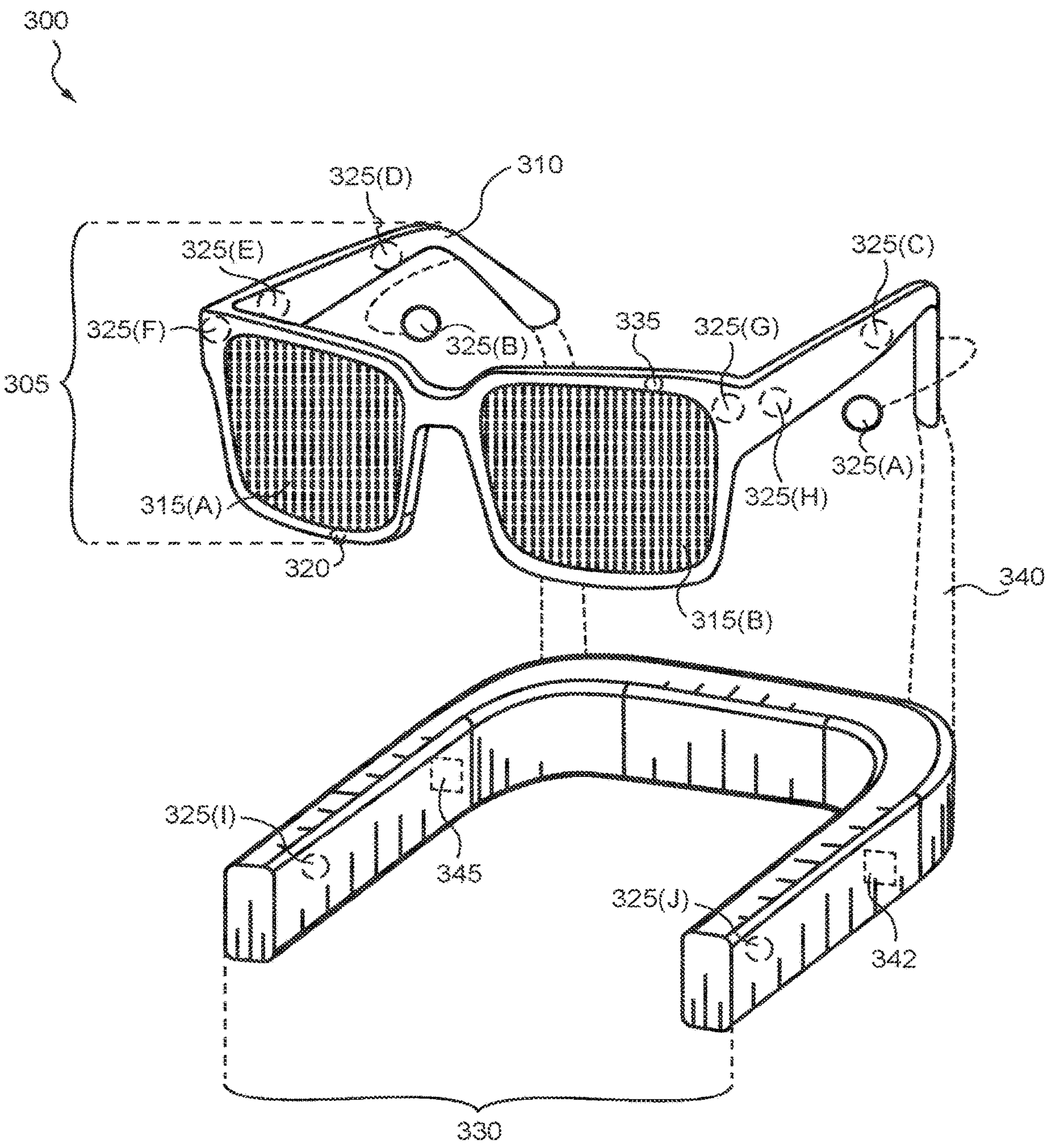
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IMU), a depth camera assembly, a structured light emitter and/or detector, or any combination thereof. In some embodiments, augmented reality system 300 may or may not include sensor 320 or may include more than one sensor. In embodiments in which sensor 320 includes an IMU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding car of the user, acoustic transducers 325(C), 325(D), 325(E), 325(F), 325(G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3A as having ten acoustic transducers, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Alternatively, or additionally, there may be additional acoustic transducers 325 on or surrounding the car in addition to acoustic transducers 325 inside the car canal. Having an acoustic transducer 325 positioned next to an car canal of a user may enable the microphone array to collect information on how sounds arrive at the car canal. By positioning at least two acoustic transducers 325 on either side of a user's head (e.g., as binaural microphones), augmented reality system 300 may simulate binaural hearing and capture a 3D stereo sound field around a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, and/or other external computing devices.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to incorporate extended reality environments more fully into their day-to-day activities.

Neckband 330 may be communicatively coupled with eyewear device 305 and/or to other devices. These other devices may provide certain functions (e.g., tracking, localizing, depth mapping, processing, storage) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325(D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium-ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 350 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (e.g., a single lens configuration that directly collimates light but results in so-called pincushion distortion) and/or a pupil-forming architecture (e.g., a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (e.g., diffractive, reflective, and refractive elements and gratings), and/or coupling elements. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises), entertainment purposes (e.g., for playing video games, listening to music, watching video content), and/or for accessibility purposes (e.g., as hearing aids, visual aids). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
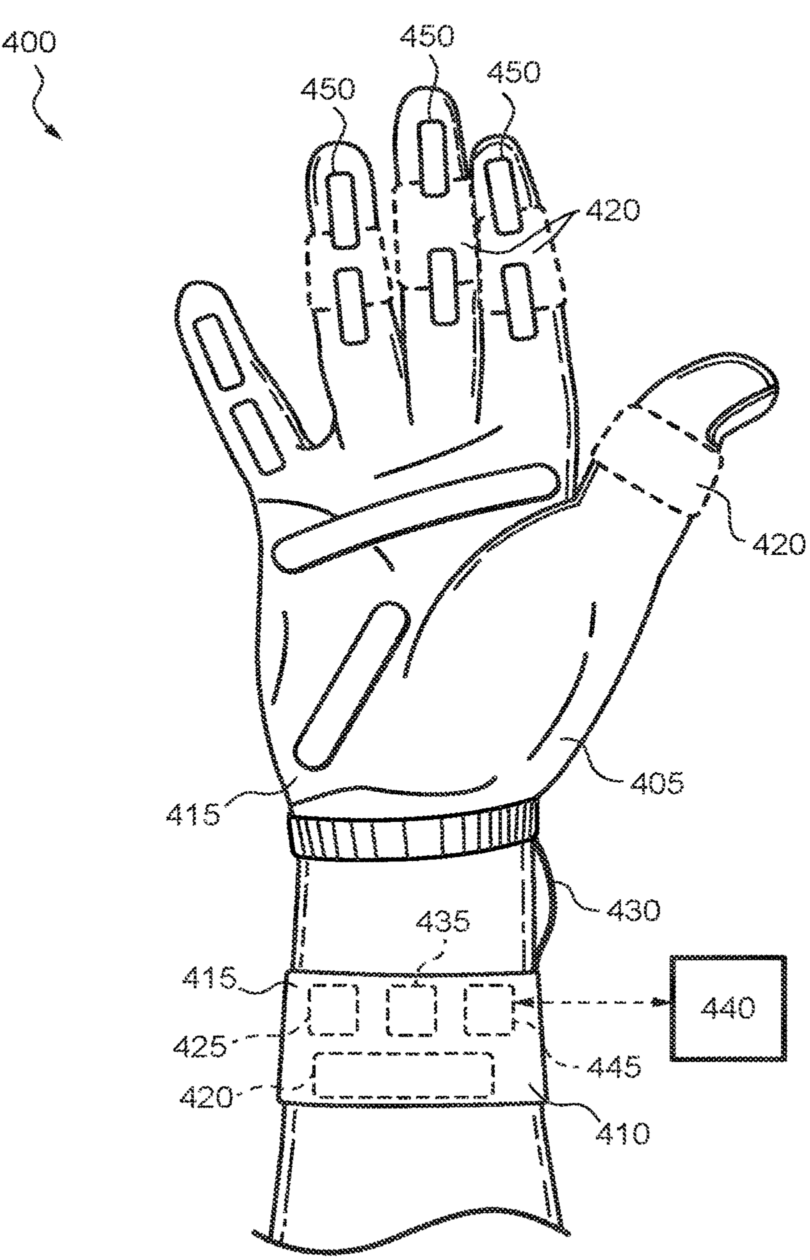
FIG. 4A is an illustration of haptic devices in accordance with various embodiments.

Haptic feedback may be provided by interfaces positioned within a user's environment (e.g., chairs, tables, floors) and/or interfaces on articles that may be worn or carried by a user (e.g., gloves, wristbands). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed reality) device, a personal computer, a tablet computer, a network device (e.g., a modem, a router), and a handheld controller. Communications interface 445 may enable communications between vibrotactile system 400 and the other device or system 440 via a wireless (e.g., Wi-Fi, Bluetooth, cellular, radio) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, and a signal from the other device or system 440

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
FIG. 4B is an illustration of an exemplary virtual reality environment in accordance with various embodiments.
Figure 4B:
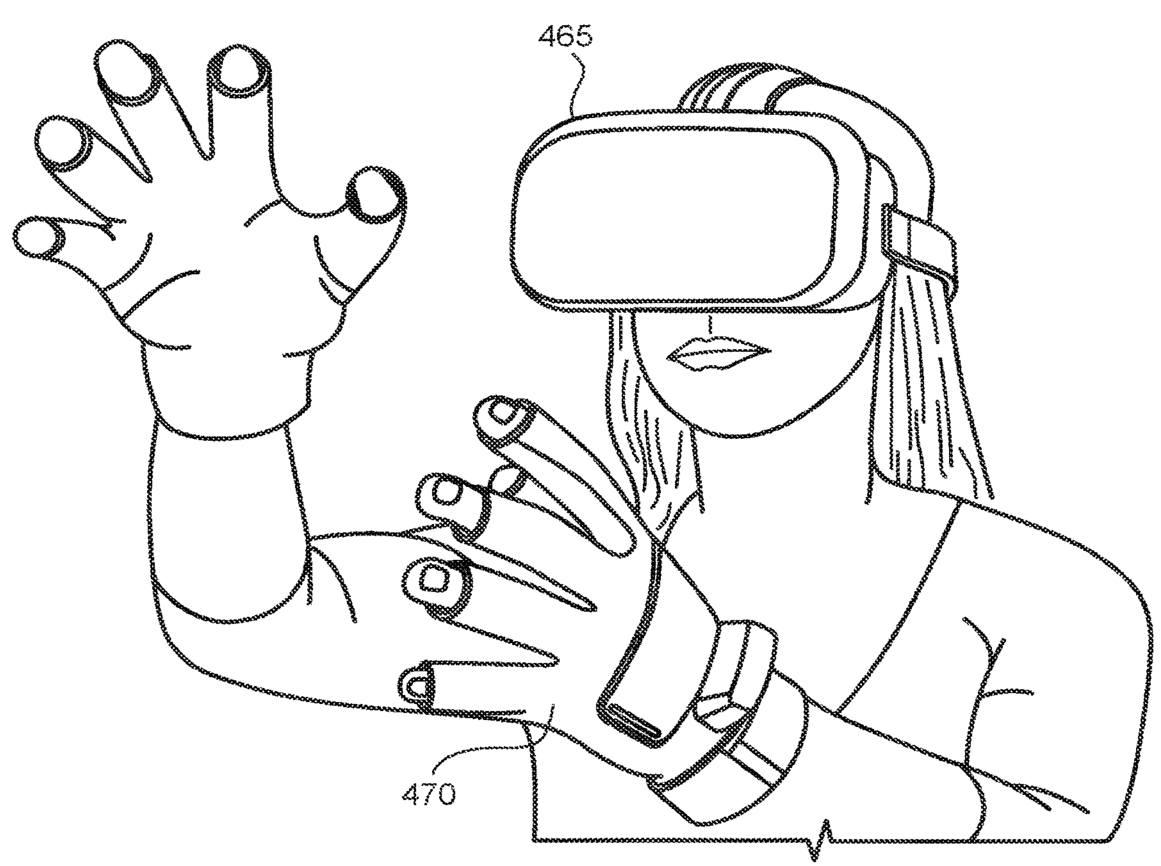

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments, there may be multiple head-mounted displays each having an associated haptic device, with each head-mounted display, and each haptic device communicating with the same console, portable computing device, or other computing system.

Figure 3B:
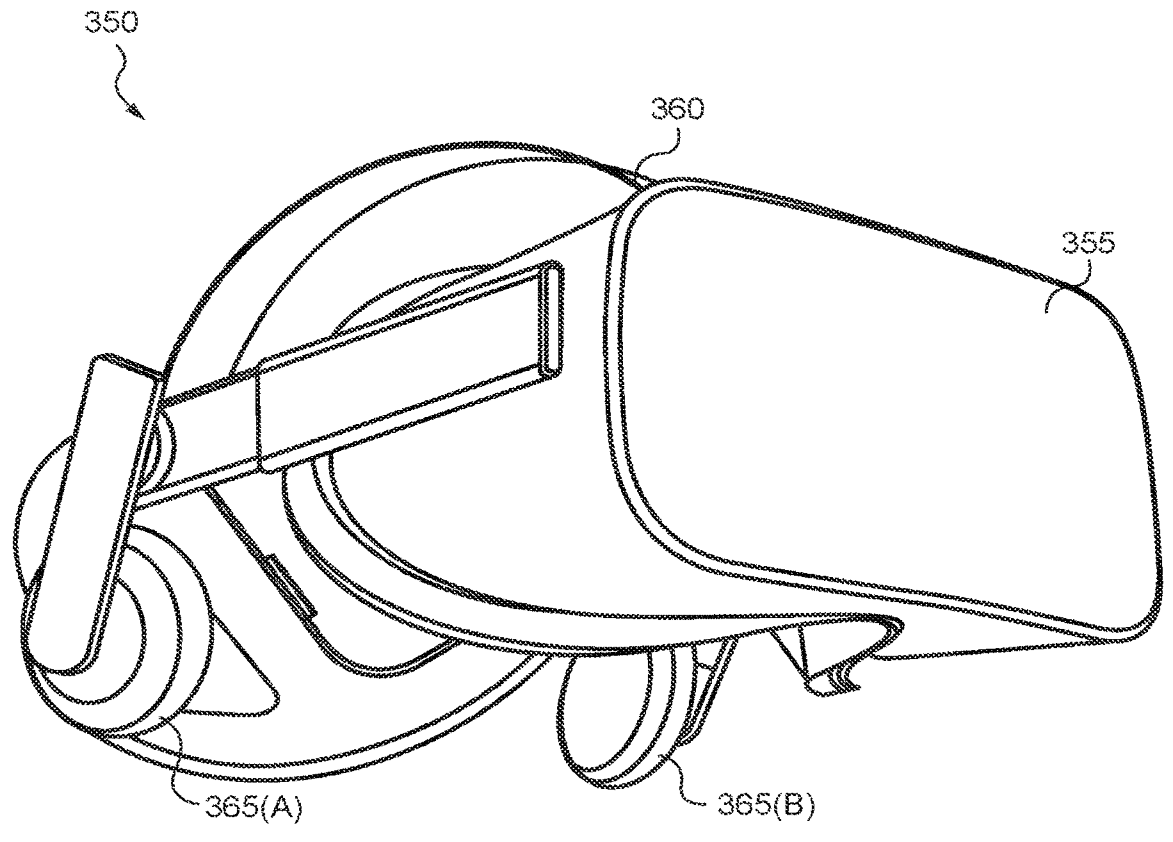
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
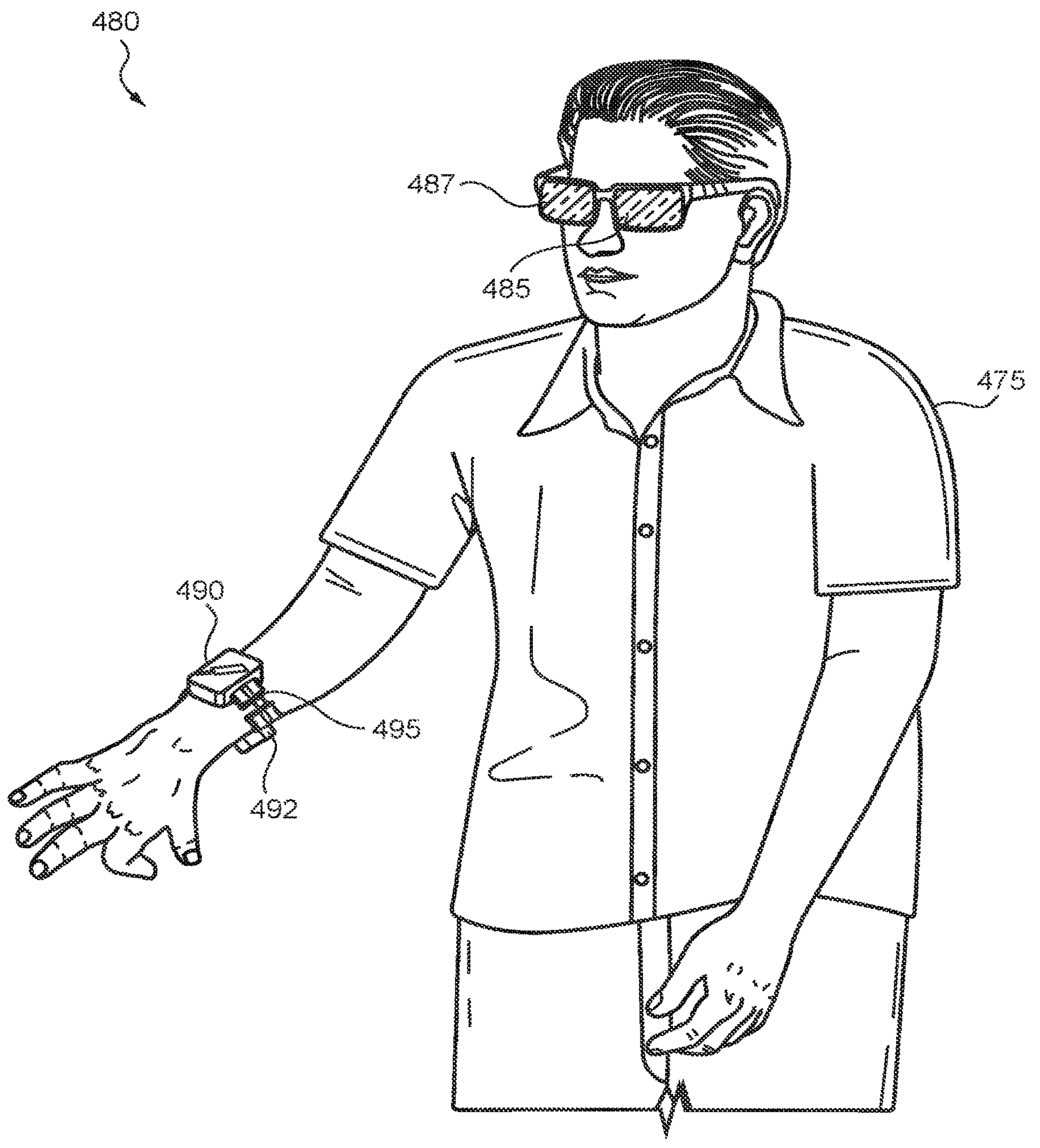
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more various types of haptic sensations to a user.

Interface Mechanisms for Error Recovery

Figure 5:
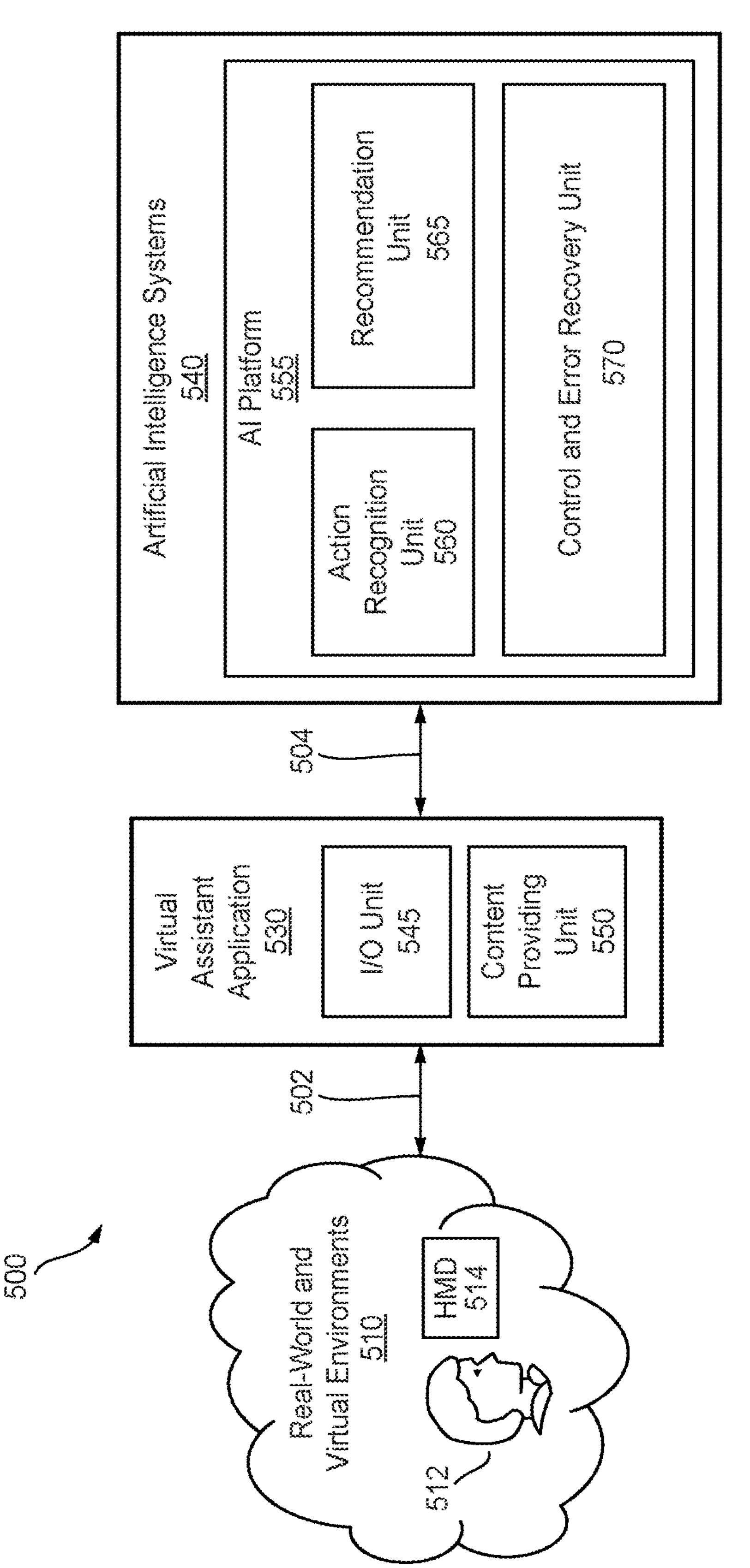
FIG. 5 is an illustration of an extended reality system for recovering from a prediction error with an artificial intelligence (AI) platform based on user activities in accordance with various embodiments.

FIG. 5 illustrates an embodiment of an extended reality system 500. As shown in FIG. 5, the extended reality system 500 includes real-world and virtual environments 510, a virtual assistant application 530, and AI systems 540. In some embodiments, the extended reality system 500 forms part of a network environment, such as the network environment 100 described above with respect to FIG. 1. Real-world and virtual environments 510 include a user 512 performing activities while wearing HMD 514. The virtual environment of the real-world and virtual environments 510 is provided by the HMD 514. For example, the HMD 514 may generate the virtual environment. In some embodiments, the virtual environment of the real-world and virtual environments 510 may be provided by another device. The virtual environment may be generated based on data received from the virtual assistant application 530 through a first communication channel 502. The HMD 514 can be configured to monitor the real-world and virtual environments 510 to obtain information about the user 512 and the environments 510 and send that information through the first communication channel 502 to the virtual assistant application 530. The HMD 514 can also be configured to receive content and information through the first communication channel 502 and present that content to the user 512 while the user 512 is performing activities in the real-world and virtual environments 510. In some embodiments, the first communication channel 502 can be implemented as links 125 as described above with respect to FIG. 1.

Figure 8:
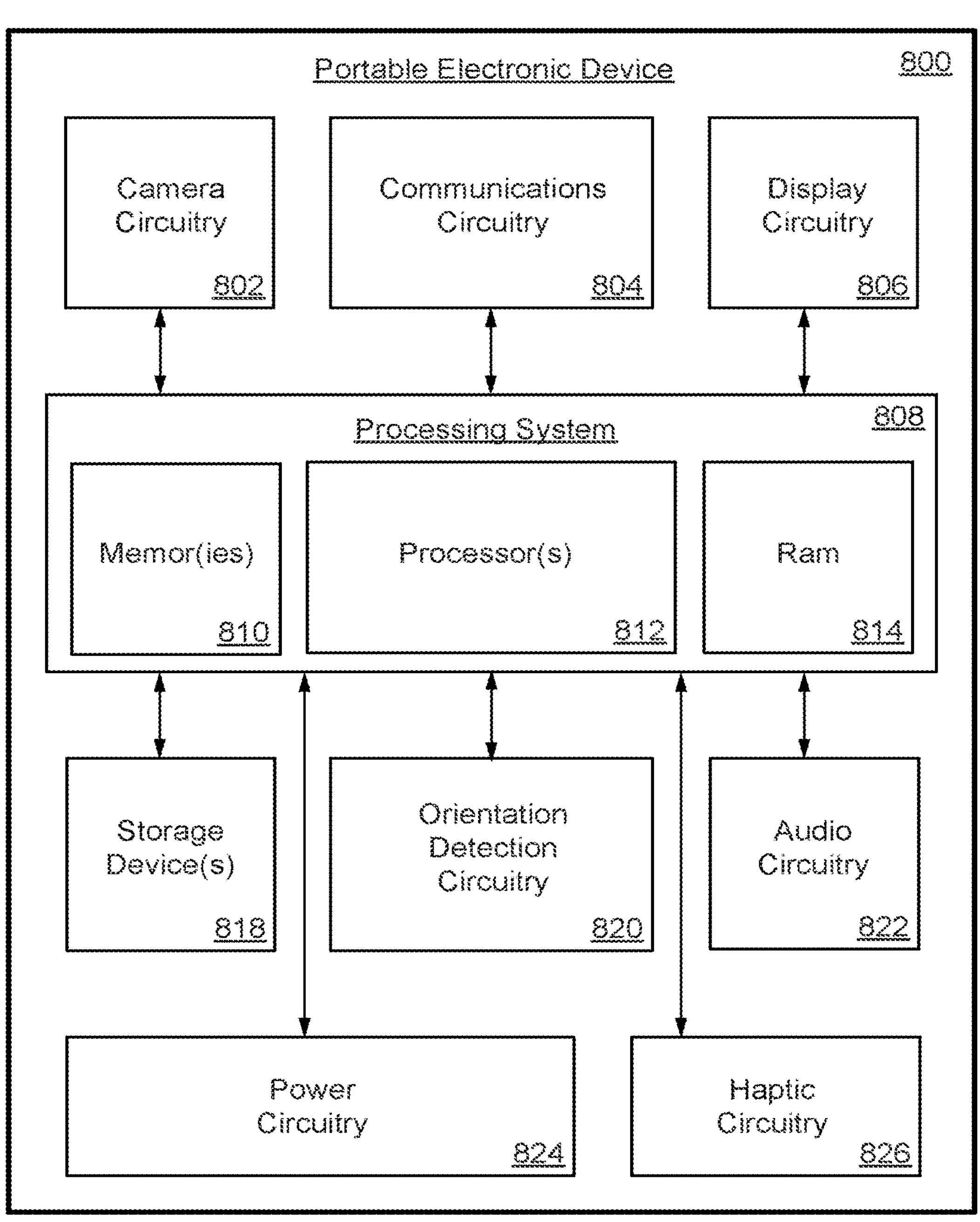
FIG. 8 is an illustration of a portable electronic device in accordance with various embodiments.

In some embodiments, the user 512 may perform activities while holding or wearing a computing device in addition to HMD 514 or instead of HMD 514. The computing device can be configured to monitor the user's activities and present content to the user in response to those activities. The computing device may be implemented as any device described above or the portable electronic device 800 as shown in FIG. 8. In some embodiments, the computing device may be implemented as a wearable device (e.g., a head-mounted device, smart eyeglasses, smart watch, and smart clothing), communication device (e.g., a smart, cellular, mobile, wireless, portable, and/or radio telephone), and/or portable computing device (e.g., a tablet, phablet, notebook, and laptop computer; and a personal digital assistant). The foregoing implementations are not intended to be limiting and the computing device may be any kind of electronic device that is configured to provide an extended reality system using a part of all of the methods disclosed herein.

The virtual assistant application 530 may be configured to provide an interface between the real-world and virtual environments 510. In some embodiments, the virtual assistant application 530 may be configured as virtual assistant application 130 described above with respect to FIG. 1. The virtual assistant application 530 may be incorporated in a client system, such as client system 105 as described above with respect to FIG. 1. In some embodiments, the virtual assistant application 530 may be incorporated in HMD 514. In this case, the first communication channel 502 may be a communication channel within the HMD 514. In some embodiments, the virtual assistant application 530 is configured as a software application. In other embodiments, the virtual assistant application 530 is configured with hardware and software that enable the virtual assistant application 530 to provide the interface between the real-world and virtual environments 510. In further embodiments, the virtual assistant application 530 includes one or more special-purpose or general-purpose processors. Such special-purpose processors may include processors that are specifically designed to perform the functions of the virtual assistant application 530.

The virtual assistant application 530 includes an input/output (I/O) unit 545 and a content-providing unit 550. The I/O unit 545 is configured to receive the information about the user 512 and the environments 510 from the HMD 514 through the first communication channel 502. In some embodiments, the I/O unit 545 may be configured to receive information about the user 512 and the real-world environment of environments 510 from one or more sensors, such as the one or more sensors 215 as described above with respect to FIG. 2A or other communication channels. The I/O unit 545 is further configured to format the information into a format suitable for other system components (e.g., AI systems 540). In some embodiments, the information about the user 512 and the environments 510 is received as raw sensory data and the I/O unit 545 may be configured to format the raw sensory data into formats for suitable further processing, such as image data for image recognition, audio data for natural language processing, and the like. The I/O unit 545 is further configured to send the formatted information through the second communication channel 504 to AI systems 540.

In some embodiments, the information collected about the user 512 and the environments 510 (i.e., data) obtained via the virtual assistant application 530 is associated with one or more privacy settings. The data may be stored on or otherwise associated with any suitable computing system or application, such as, for example, a social-networking system, a client system, a third-party system, a messaging application, a photo-sharing application, a biometric data acquisition application, an artificial-reality application, a virtual assistant application, and/or any other suitable computing system or application.

Privacy settings (or "access settings") for the data may be stored in any suitable manner; such as, for example, in association with data, in an index on an authorization server, in another suitable manner, or any suitable combination thereof. A privacy setting for data may specify how the data (or particular information associated with the data) can be accessed, stored, or otherwise used (e.g., viewed, shared, modified, copied, executed, surfaced, or identified) within an application (such as an extended reality application). When privacy settings for the data allow a particular user or other entity to access that the data, the data may be described as being "visible" with respect to that user or other entity. As an example, a user of an extended reality application or virtual assistant application may specify privacy settings for a user profile page that identify a set of users that may access the extended reality application or virtual assistant application information on the user profile page, thus excluding other users from accessing that information. As another example, an extended reality application or virtual assistant application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for the data may specify a "blocked list" of users or other entities that should not be allowed to access certain information associated with the data. In some cases, the blocked list may include third-party entities. The blocked list may specify one or more users or entities for which the data is not visible.

Privacy settings associated with the data may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data of the same type associated with a user may have different privacy settings. In addition, one or more default privacy settings may be set for each piece of data of a particular data-type.

The content-providing unit 550 is configured to provide content to the HMD 514 for presentation to the user 512. In some embodiments, the content-providing unit 550 may be configured to provide content to one or more other devices. The content may be the extended reality content 225 described above with respect to FIG. 2A. In some embodiments, the content may be other content, such as audio, images, video, graphics, Internet-based content (e.g., webpages and application data), and the like. The content may be received from AI systems 540 through the second communication channel 504. In some embodiments, the content may be received from other communication channels. In some embodiments, the content provided by the content-providing unit 550 may be content received from AI systems 540 such as a recommendation from recommendation unit 565 and/or content received from other sources.

AI systems 540 may be configured to enable the extended reality system 500 to fine-tune an AI platform based on user activities. In some embodiments, the AI systems 540 may be configured as AI systems 140 described above with respect to FIG. 1. The AI systems 540 may be incorporated in a virtual assistant engine, such as virtual assistant engine 110 as described above with respect to FIG. 1. In some embodiments, the AI systems 540 may be incorporated in HMD 514. In some embodiments, the AI systems 540 is configured as a software application. In other embodiments, the AI systems 540 is configured with hardware and software that enable the AI systems 540 to enable the extended reality system 500 to fine-tune an AI platform based on user activities. In further embodiments, the AI systems 540 include one or more special-purpose or general-purpose processors. Such special-purpose processors may include processors that are specifically designed to perform the functions of the AI systems 540. In other embodiments, processing performed by the AI systems 540 may be distributed across a plurality of computing devices, such as a distributed computing network, a data center, or a cloud computing system.

In some embodiments, the AI systems 540 may be implemented in a computing device, such as any of the devices described above or the portable electronic device 800 as shown in FIG. 8. In some embodiments, the computing device may be implemented as a wearable device (e.g., a head-mounted device, smart eyeglasses, smart watch, and smart clothing), communication device (e.g., a smart, cellular, mobile, wireless, portable, and/or radio telephone), and/or portable computing device (e.g., a tablet, phablet, notebook, and laptop computer; and a personal digital assistant). The foregoing implementations are not intended to be limiting and the computing device may be any kind of electronic device that is configured to provide an extended reality system using a part of all of the methods disclosed herein.

AI systems 540 includes an AI platform 555, which is a machine-learning-based system that is configured to be implemented based on user activities. The AI platform 555 includes an action recognition unit 560, a recommendation unit 565, and a control and error recovery unit 570. The AI platform 555 may include one or more special-purpose or general-purpose processors. Such special-purpose processors may include processors that are specifically designed to perform the functions of the action recognition unit 560, the recommendation unit 565, and the control and error recovery unit 570. Additionally, each of the action recognition unit 560, the recommendation unit 565, and the control and error recovery unit 570 may include one or more special-purpose or general-purpose processors that are specifically designed to perform the functions of those units. Such special-purpose processors may be application-specific integrated circuits (ASICs) or field-programmable gate arrays (FPGAs) which are general-purpose components that are physically and electrically configured to perform the functions detailed herein. Such general-purpose processors may execute special-purpose software that is stored using one or more non-transitory computer-readable media, such as random-access memory (RAM), flash memory, a hard disk drive (HDD), or a solid-state drive (SSD). Further, the functions of the components of the AI platform 555 can be implemented using a cloud-computing platform, which is operated by a separate cloud-service provider that executes code and provides storage for clients.

The action recognition unit 560 is configured to recognize actions performed by the user 512 while the user 512 is interacting with and within the environments 510 and context surrounding such actions. For example, the user 512 wearing HMD 514 may perform one or more activities (e.g., walking around the house, exercising) in a real-world environment of the environments 510 and may perform one or more activities (e.g., learn a new task, read a book) in a virtual environment of the environments 510. In some embodiments, the action recognition unit 560 is configured to recognize other events or context occurring (e.g., ambient sounds, ambient light, other users) in the environments 510. The action recognition unit 560 is configured to recognize actions and other events using information acquired by HMD 514 and/or one or more sensors, such as the one or more sensors 215 as described with respect to FIG. 2A. For example, HMD 514 and the one or more sensors obtain information about the user 512 and the environments 510 and send that information through the first communication channel 502 to the virtual assistant application 530. The I/O unit 545 of virtual assistant application 530 is configured to receive that information and format the information into a format suitable for AI systems 540. In some embodiments, the I/O unit 545 may be configured to format the information into formats for suitable further processing, such as image data for image recognition, audio data for natural language processing, and the like. The I/O unit 545 is further configured to send the formatted information through the second communication channel 504 to AI systems 540.

In some embodiments, the action recognition unit 560 is configured to collect data corresponding to those activities and context thereof using one or more action recognition algorithms such as the pre-trained models in the GluonCV toolkit and one or more natural language processing algorithms such as the pre-trained models in the GluonNLP toolkit. In some embodiments, the action recognition unit 560 is configured to recognize other events using one or more image recognition algorithms such as semantic segmentation and instance segmentation algorithms, one or more audio recognition algorithms such as a speech recognition algorithm, and one or more event detection algorithms.

In some embodiments, the action recognition unit 560 includes one or more machine learning models (e.g., neural networks, support vector machines, and/or classifiers) that are trained to detect and recognize actions performed by the user 512 while the user 512 is interacting with and within the environments 510 and objects and events occurring in environments 510 while the user 512 is interacting with and within the environments 510. The action recognition unit 560 can be trained to recognize conditions, actions, or both based on training data. The training data can include characteristics of previously recognized conditions, actions, or both (e.g., historical actions or routines). In some embodiments, the one or more machine-learning models can be trained by applying supervised learning or semi-supervised learning using training data that includes labeled observations, where each labeled observation includes an action with various characteristics correlated to other actions with similar characteristics. In some embodiments, the one or more machine learning models may be fine-tuned based on activities performed by the user 512 while interacting with and within environments 510.

In some embodiments, the action recognition unit 560 is configured to recognize actions performed by the user 512 and group those actions into one or more activity groups. Each of the one or more activity groups may be stored in a respective activity group data structure that includes the actions of the respective activity group. Each activity group data structure may be stored in one or more memories (not shown) or storage devices (not shown) for the AI systems 540. In some embodiments, the action recognition unit 512 groups actions using one or more clustering algorithms such as a k-means clustering algorithm and a mean-shift clustering algorithm. For example, the user 512 in environments 510 may wake up in their bedroom every day at 6:30 AM after sleeping and put on HMD 514. Subsequently, the user 512 may perform a sequence of actions while wearing HMD 514. For example, the user 512 may get dressed in their bedroom immediately after waking, walk from the bedroom to the kitchen immediately after getting dressed, and stay there until their commute to work (e.g., at 8 AM). Upon entering the kitchen, the user 512 may turn on the lights, make coffee, and turn on a media playback device (e.g., a stereo receiver, a smart speaker, a television). While drinking coffee, the user 512 may check email, and read the news. Upon leaving the kitchen, the user 512 may check traffic for the commute to work. The action recognition unit 560 is configured to detect, recognize, and learn this sequence of actions and group the actions of this sequence of actions into a group such as morning activity group. In some embodiments, the action recognition unit 560 is configured to learn and adjust model parameters based on the learned sequence of actions and corresponding group.

The recommendation unit 565 is configured to extract features from the actions and context thereof. The extracted features may comprises: (i) one or more conditions, (ii) one or more actions, (iii) connections between the one or more events, conditions, and actions, or (iv) any combination thereof. The recommendation unit 565 is configured to provide a prediction such as a recommended course of action or suggested activity based on the extracted features and model parameters learned from historical activity of one or more users. For example, the recommendation unit 565 may be configured to predict a recommended course of action or suggested activity for an activity or activity group determined by the action recognition unit 560. Although the predictions by the recommendation unit 565 are described herein typically with respect to a recommendation (e.g., a recommended course of action or suggested activity) it should be understood that the recommendation unit 565 could be trained to provide other predictions such as observations, classifications, forecasts, and the like. In some embodiments, the recommendation unit 565 includes one or more machine learning models (e.g., neural networks, support vector machines, and/or classifiers) that are trained to make predictions based on various inputs such as user activity. The recommendation unit 565 can be trained to predict a recommendation based on training data that includes characteristics of previously determined activities or activity groups (e.g., historical activity groups) and previously predicted recommendations (e.g., historical recommended courses of action). In some embodiments, the one or more machine-learning models can be trained by applying supervised learning or semi-supervised learning using training data that includes characteristics of previously determined activities or activity groups labeled with recommendations, where each labeled recommendation is a ground truth recommended course of action or suggested activity. In some embodiments, the one or more machine learning models may be fine-tuned based on activities or activity groups performed by the user 512 while interacting with and within environments 510.

In order to predict the recommendation, the recommendation unit 565 is configured analyze the characteristics of the activity of a user or of other events occurring in environments 510 while the actions were being performed to determine features and relationships between features of the characteristics. For example, and continuing with the example described above, for a morning activity group that includes actions such as putting on the HMD 514, getting dressed, walking to a different room, turning on the lights, making coffee, turning on a media playback device, checking email, reading the news, and checking traffic, the recommendation unit 565 may analyze the characteristics of these actions and/or the characteristics of other environmental events occurring while these actions are being performed to determine the conditions or context in which these actions are performed. In this example, the recommendation unit 565 can determine that the conditions or context include the user being in the user's bedroom and kitchen every day between the hours of 6:30-8 AM; dressing in the bedroom before entering the kitchen; turning on the lights, playing music, and making coffee upon entering the kitchen; drinking coffee while checking email and reading the news; and checking traffic upon exiting the kitchen.

The recommendation unit 565 is further configured to predict one or more recommendations for executing the one or more actions by associating respective actions with the determined conditions or context and generating one or more recommendations for the determined associations. For example, and continuing with the example described above, the recommendation unit 565 can associate the user being in the user's bedroom between the 6:30-7 AM with the user getting dressed to go to work and generate a corresponding recommendation (e.g., conditional statement: if the user is in the user's bedroom between 6:30-7 AM, then clothes for getting dressed in should be determined and recommended). The recommendation unit 565 can associate the user entering the user's kitchen between 6:45-7:30 AM after the user is dressed with setting the mood and generate a corresponding conditional statement (e.g., conditional statement: if the user enters the user's kitchen between 6:45-7:30 AM and turns on the lights, then music should be selected and recommended or played and a coffee recipe should be identified and recommended). The recommendation unit 565 can associate the user drinking coffee in the user's kitchen between 7:15-8 AM with being informed and generate a corresponding conditional statement (e.g., conditional statement: if the user drinks coffee in the user's kitchen between 7:15-8 AM, then present email and today's news). The recommendation unit 565 can associate the user exiting the user's kitchen between 7:45-8:15 AM with leaving for work and generate a corresponding conditional statement (e.g., conditional statement: if the user exits the user's kitchen between 7:45-8:15 AM, then present traffic along the user's route, an expected time of arrival at the office, and expected weather during the commute).

The recommendation unit 565 is further configured to group the recommendations for each activity group into a recommendation for that activity group. The recommendation may be stored in a respective group data structure that includes recommendations for the one or more actions such as one or more conditional statements for executing the one or more actions. Each control structure data structure may be stored in one or more memories (not shown) or storage devices (not shown) for the AI systems 540.

The recommendation unit 565 may be further configured to generate and execute a new routine and/or modify a pre-existing routine based on a recommendation. A routine refers to a set of actions executed by extended reality system 500 in response to satisfaction of one or more conditions. The recommendation unit 565 may be configured to generate the routine and/or modify a pre-existing routine by selecting one or more conditional statements of a control structure, determining actions to be taken in response to one or more conditions of the one or more conditional statements being satisfied, and arranging the selected one or more conditional statements along with the corresponding determined actions in a prescribed order. For example, and continuing with the example described above, for a control structure that includes conditional statements associated with the morning activity group, the recommendation unit 565 may select a first conditional statement (e.g., if the user is in the user's bedroom between 6:30-7 AM, then clothes for getting dressed in should be determined and recommended) and a second conditional statement (e.g., if the user enters the user's kitchen between 6:45-7:30 AM and turns on the lights in the kitchen, then music should be selected and recommended or played and a coffee recipe should be identified and recommended) to be included in that order in the routine. The recommendation unit 565 may then determine one or more actions to be taken for each conditional statement included in the routine. For example, for the first conditional statement, the recommendation unit 565 may determine that the action to be taken is to present a visual style guide with the latest fashions to the user 512 on a display of the HMD 514, and, for the second conditional statement, the recommendation unit 565 may determine that the actions to be taken are to present a music playlist to the user 512 on the display of the HMD 514, play music from the music playlist through speakers of the HMD 514, and present a recipe for making coffee on the display of the HMD 514.

In some embodiments, the recommendation unit 565 generates the routine and/or modifies the pre-existing routine when a recommendation is predicted. For example, the recommendation unit 565 may generate a routine and/or modify a pre-existing routine based on the predicted recommendation. In some embodiments, the recommendation unit 565 generates the routine and/or modifies the pre-existing routine upon request by the user 512. In some embodiments, using one or more natural language statements, gazes, and/or gestures, the user 512 may interact with HMD 514 and request for one or more routines to be generated. For example, after the user 512 performs actions in the environments 510, the user 512 may request for the HMD 514 to determine if enough actions have been performed to predict a control structure and to generate a routine and/or modify the pre-existing routine from the control structure. In some embodiments, recommendation unit 565 is configured to generate a routine and/or modify a pre-existing routine from more than one control structure. For example, the recommendation unit 565 may select conditional statements from different control structures and generate a routine and/or modify a pre-existing routine having conditional statements and corresponding actions from those different control structures. In this way, a new routine may be generated and/or a pre-existing routine may be modified based on various sequences of actions performed by the user 512 interacting with and within the environments 510.

In some embodiments, recommendations such as routines generated and/or modified by the recommendation unit 565 may be stored in a respective routine data structure that includes the selected one or more conditional statements along with the corresponding actions arranged in a prescribed order. Each routine data structure may be stored in one or more memories (not shown) or storage devices (not shown) for the AI systems 540.

The recommendation unit 565 may be further configured to execute a generated routine and/or a modified pre-existing routine when the user 512 wears HMD 514 and interacts with and within environments 510. In some embodiments, the recommendation unit 565 executes one or more routines when a user, such as the user 512, puts on a device, such as HMD 514. In some embodiments, the recommendation unit 565 executes one or more routines when the recommendation unit 565 generates the one or more routines and/or modifies the one or more routines. For example, the recommendation unit 565 may execute a routine when the interactions of the user 512 wearing HMD 514 with and within environments 510 prompts the recommendation unit 565 to predict a control structure and/or modify a control structure. In some embodiments, the recommendation unit 565 may execute a routine upon request by the user 512. For example, using one or more natural language statements, gazes, and/or gestures, the user 512 may interact with HMD 514 and request for one or more routines to be executed. In this case, upon user request, HMD 514 may present the user 512 with a list of routines that have been generated and/or modified and the user 512 may interact with HMD 514 to select one or more routines for execution. In some embodiments, the recommendation unit 565 is configured to execute more than one routine at a time. For example, the recommendation unit 565 may select multiple routines from generated and/or modified routines and execute those routines concurrently and/or sequentially.

In some embodiments, the recommendation unit 565 is configured execute a generated and/or modified pre-existing routine by obtaining recognized actions and other events while the user 512 is interacting with and within environments 510, determining whether any of the recognized actions and other events satisfy any conditions of any conditional statements in any stored routine, and executing the actions that correspond to the one or more conditional statements in which a condition has been satisfied. For example, and continuing with the example described above, the user 512 in environments 510 may wake up in their bedroom at 6:30 AM and put on HMD 514. Subsequently, the user 512 may perform a sequence of actions while wearing HMD 514 such as get dressed in their bedroom and go to the kitchen to make coffee and catch up on email and the news. Upon determining that the user 512 is wearing the HMD 514 in their bedroom between 6:30-7 AM, the recommendation unit 565 may execute one or more corresponding actions such as present a visual style guide with the latest fashions to the user 512 on a display of the HMD 514. Similarly, upon determining that the user 512 is dressed and enters the kitchen between 6:45-7:30 AM, the recommendation unit 565 may execute one or more corresponding actions such as present a music playlist to the user 512 on the display of the HMD 514, play music from the music playlist through speakers of the HMD 514, and present a recipe for making coffee on the display of the HMD 514. In this way, when a routine is executed, an action corresponding to a conditional statement is taken only if the condition associated with that conditional statement is satisfied and previous, if any, conditions are satisfied.

In some embodiments, a condition may be satisfied when any of the recognized actions and other events match any actions or events associated with the condition. In some embodiments, a recognized action and/or other event matches an action and/or event associated with the condition when a similarity measure that corresponds to a similarity between the recognized action and/or the recognized event and the action and/or event associated with the condition equals or exceeds a predetermined amount. In some embodiments, the similarity measure may be expressed as a numerical value within a range of values from zero to one and the predetermined amount may correspond to a numerical value within a range of values from 0.5 to one. In some embodiments, the recognized action and/or the recognized event can be expressed as a first vector and the action and/or the event associated with the condition can be expressed as a second vector and the similarity measure may measure how the similar the first vector is to the second vector and if the similarity measure between the first and second vectors equals or exceeds a predetermined amount (e.g., 0.5), then the recognized action and/or recognized event can be considered as matching the action and/or event associated with the condition. The foregoing is not intended to be limiting and other methods may be used to determine whether the recognized action and/or the recognized event matches the action and/or event associated with the condition. For example, one or more explicit matching and implicit matching algorithms may be used.

In some embodiments, the recommendation unit 565 is configured to execute actions of a routine by generating content and sending that content to the virtual assistant application 530 through the second communication channel 504. In some embodiments, the content-providing unit 550 of the virtual assistant application 530 is configured to provide the content to the HMD 514 for presentation to the user 512 while the user 512 is interacting with and within the environments 510. The content may be the extended reality content 225 described above with respect to FIG. 2A. In some embodiments, the content may be other content, such as audio, images, video, graphics, Internet-based content (e.g., webpages and application data), and the like.

The control and error recovery unit 570 is configured to interface with the AI platform 555 to facilitate error recovery from inaccurate recommendations. After the action recognition unit 560 recognizes actions performed by the user 512 while the user 512 is interacting with and within the environments 510 and the recommendation unit 565 predicts a recommendation such as a recommended course of action or suggested activity, the control and error recovery unit 570 is configured to: (i) generate a user interface comprising one or more graphical user interface elements configured to enable the user 512 to recovery from an inaccurate recommendation, (ii) receive a request from the user 512 via the user interface to recovery from an inaccurate recommendation, (iii) generate a response based on the received request from the user 512, and (iv) present the response to the user 512 via the user interface. An inaccurate recommendation being a recommendation to the user 512 that is perceived by the user 512 as not being relevant or incorrect given a user's present context. The user's present context comprising any relevant information that can be used to characterize the situation of a user.

In some instances, the user interface is generated in response to a user requesting error recovery (e.g., the user 512 announcing in natural language or indicating via gesture that a recommendation is inaccurate and the user 512 would like to recover from the inaccurate recommendation). In some instances, the user interface is generated automatically without a user requesting error recovery (e.g., generated as part of the content associated with the recommendation or as a separate piece of content displayed to the user). The control and error recovery unit 570 is configured to provide the user interface to a user 512 by generating content and sending that content to the virtual assistant application 530 through the second communication channel 504. The content-providing unit 550 of the virtual assistant application 530 is configured to provide the content including the user interface to the HMD 514 for presentation to the user 512 while the user 512 is interacting with and within the environments 510. For example, the content-providing unit 550 may render the user interface within the environments 510 viewed by the user via the HMD 514. The content-providing unit 550 may present on display of HMD 514 the graphical user interface with selectable options including an option to generate a new recommendation, modify the recommendation, or a combination thereof. In some embodiments, the user 512 may make one or more menu selections using one or more natural language statements, gazes, and/or gestures. The action recognition unit 560 is configured to monitor the HMD 514 for one or more natural language statements, gazes, and/or gestures made by the user 512 while the user 512 is interacting with the one or more graphical user interface elements that reflect how the user 512 would like to recover from an inaccurate recommendation. In response to the user selecting the option to generate a new recommendation, modify the recommendation, or a combination thereof, the control and error recovery unit 570 may notify the action recognition unit 560 and the recommendation unit 565 to generate a new recommendation and/or modify the recommendation. For example, while the user 512 is interacting with and within environments 510, the user 512 may interact with a user interface element ("try my luck again") associated with generating another recommendation ("try my luck again"). The action recognition unit 560 may recognize this interaction as a request to make another prediction for a recommendation, and notify the control and error recovery unit 570 of the request. In response, the control and error recovery unit 570 may notify the action recognition unit 560 to recognize new actions and other events using information acquired by HMD 514 and/or one or more sensors, notify the recommendation unit 565 to predict a new recommendation based on the new actions and other events recognized by the action recognition unit 560, and the control and error recovery unit 570 may notify the content providing unit 550 to present a response as content to the user 512 that includes the new recommendation.

The user interface generated by the control and error recovery unit 570 includes one or more graphical user interface elements that allow the user 512 to generate a new recommendation, modify the recommendation, or a combination thereof. Generating a new recommendation is essentially the user 512 requesting to try their luck again at having the recommendation unit 565 refresh the recommendation by making a prediction of a new recommendation based on updated input data. For example, possibly the angle of the user's head has changed clarifying what the user's gaze is focused on, and thus the refresh of the new recommendation will be more accurate than the prior recommendation. The modification of the recommendation may include the user 512 actively or expressly change/modify the recommendation using one or more natural language statements, gazes, and/or gestures. In some instances, the modification is implemented via the user interface, e.g., scrolling for through more options for the recommendation, refreshing or reinstantiating the recommendation via a menu such as a menu displayed in the user interface, or voice command concerning options presented within the user interface. In other instances, the modification is implemented via other means than the user interface, e.g., voice command concerning what exactly the user would like to have as a recommendation or editing the recommendation or control structure via an editing tool separate from the user interface. The combination of generating a new recommendation and modifying the recommendation may include the user 512 specifically changing their activity or input recognized by the action recognition unit 560 (e.g., pointing out a specific object of interest to the user 512), and having the recommendation unit 565 refresh the recommendation by making a prediction of a new recommendation based on the updated input data. In some instances, the control and error recovery unit 570 is configured to provide, using the user interface, hints as to what additional input may facilitate error recovery (e.g., different viewing angle, more light, optimal distance from an object, and the like), and the user 512 may use the hints to facilitate changing their activity or input recognized by the action recognition unit 560.

Figure 6A:
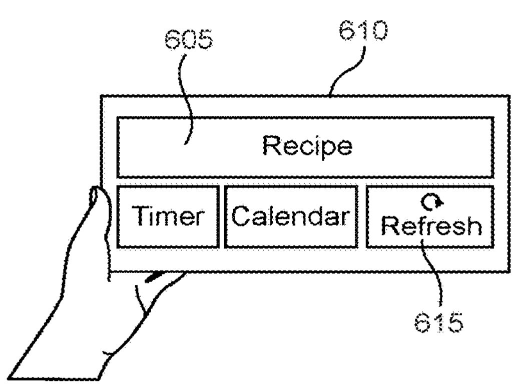
FIGS. 6A, 6B, and 6C are illustrations of user interfaces for error recovery in accordance with various embodiments.
Figure 6B:
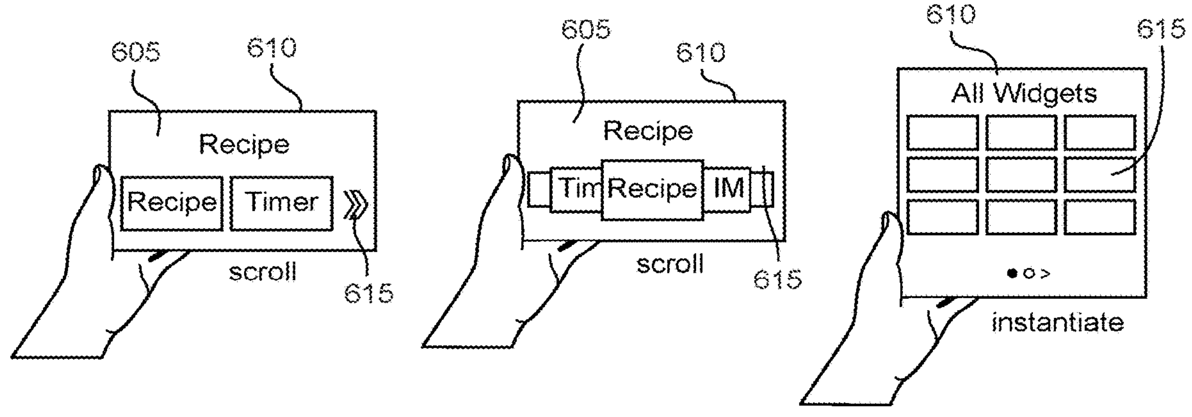
Figure 6C:
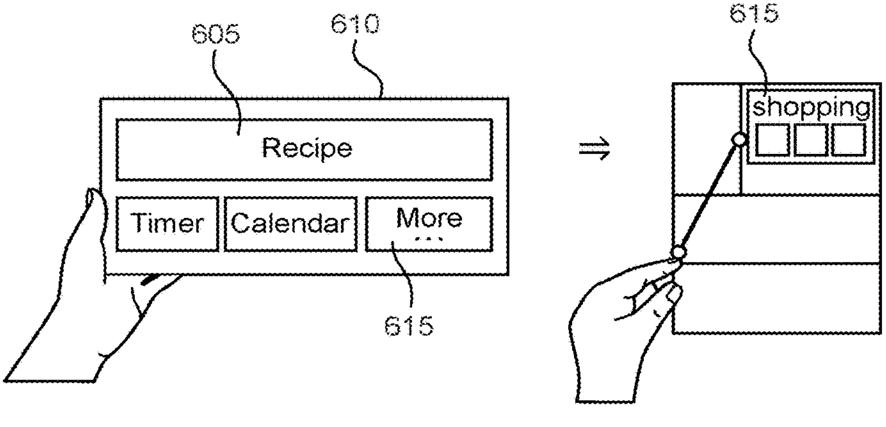

FIGS. 6A-6C show example of various user interfaces and elements thereof that can be generated by the control and error recovery unit 570 to facilitate error recovery. As shown in FIG. 6A, a recommendation 605 may be displayed in user interface 610 along with a user interface element 615 (e.g., a refresh button) configured to request the recommendation unit 565 to refresh the recommendation by making a prediction of a new recommendation based on updated input data. As shown in FIG. 6B, a recommendation 605 may be displayed in user interface 610 along with a user interface element 615 (e.g., alternative recommendations presented in a scrollable or selectable mechanism such as a list or grid) configured to change/modify the recommendation 605 actively or expressly. As shown in FIG. 6C, a recommendation 605 may be displayed in user interface 610 along with user interface elements 615 (e.g., one or more buttons in conjunction with a pointer) configured to change/modify the recommendation 605 actively or expressly by facilitating modification of activity or input by the user 512 and then requesting the recommendation unit 565 to refresh the recommendation by making a prediction of a new recommendation based on updated input data.

In some embodiments, the control and error recovery unit 570 determines which user interfaces and elements thereof to generate based on preferences of the user. For example, user preferences for recovering from an error using a new recommendation, modifying the recommendation, or a combination thereof can be stored in a user profile comprising preferences of the user 512. The control and error recovery unit 570 uses the user preferences to determine which user interface the user prefers to be displayed for error recovery. As should be understood, the preference of the user allows for the user to fine tune how much control they want over the error recovery process. The preference can be set-up with coarse or fine grain tuning whereby the user can configure their preference for a certain user interface is some situations (e.g., when greater control is expected such as navigation or tutorial recommendations) versus a different user interface in other situations (e.g., when lesser control is expected such as restaurant or product recommendations).

In some embodiments, the control and error recovery unit 570 determines which user interfaces and elements thereof to generate based on probability of the recommendation being accurate or inaccurate. Probability in this instance refers to the recommendation unit's 565 confidence (i.e., confidence score) in making the prediction for a recommendation. So, a probability of 70% for a recommendation means the recommendation unit's 565 (e.g., machine-learning model) is 70% confident that the observations point towards a given recommendation being provided. This is different from classification accuracy which speaks to the actual correctness of that prediction as verified by a person. So, the model can be confident (70%) but be wrong (inaccurate). The confidence equals the probability. A one or more thresholds can be set for the probability that can be used to determine which user interface is generated. For example, it may be determined that using a new recommendation is associated with a least amount of control by the user and thus may only be generated for instances where the recommendation unit's 565 confidence is greater than 80%;

whereas the modification of the recommendation or a mix between modification and a new recommendation are associated with a greater amount of control by the user and thus may only be generated for instances where the recommendation unit's 565 confidence is less than 80%. The one or more thresholds are a parameter that may be calibrated with users during a pilot or beta program or over historical use of the virtual assistant application 530. So, the users after using the model could determine that a probability of 75% is too low of a threshold for providing a user interface to modify the recommendation and it makes more sense for it to be 90% so that users do not get prompted for modifications and instead are prompted for a new recommendation.

In some embodiments, the probability of the recommendation being accurate or inaccurate can also be used to determine which alternative options are provided with the user interface in order to allow for error recovery via modification of the recommendation. For example, the recommendation unit 565 may provide a confidence score for a number of predicted possible recommendations, and typically the possible recommendation with the highest confidence will be output by the recommendation unit 565 as the predicted recommendation. However, the recommendation unit 565 may also communicate the other possible recommendations with their corresponding confidence score to the control and error recovery unit 570, and the control and error recovery unit 570 can generate the user interface with the other possible recommendations as alternatives to the recommendation based on the corresponding confidence scores (e.g., sorted or ranked in the user interface based on confidence score). The number of alternative options provided can be determined based on user preference such as preferences in the user profile or based on other factors such as a default predefined number or number of possible recommendation over a certain confidence threshold such as 50%.

In some embodiments, the input received via the control and error recovery unit 570 via the user interface is collected, stored with the original recommendation and recognized activity of the user as training data, and used by the artificial intelligence platform 555 to fine tune or retrain one or more machine-learning models used by the recommendation unit 565. The fine tuning or retraining can be implemented at set points of time or after a certain number of data points concerning error recovery have been collected. The fine tuning or retraining generated updated machine-learning models that are then used by the recommendation unit 565 to predict recommendations thereafter.

Techniques for Error Recovery

Figure 7:
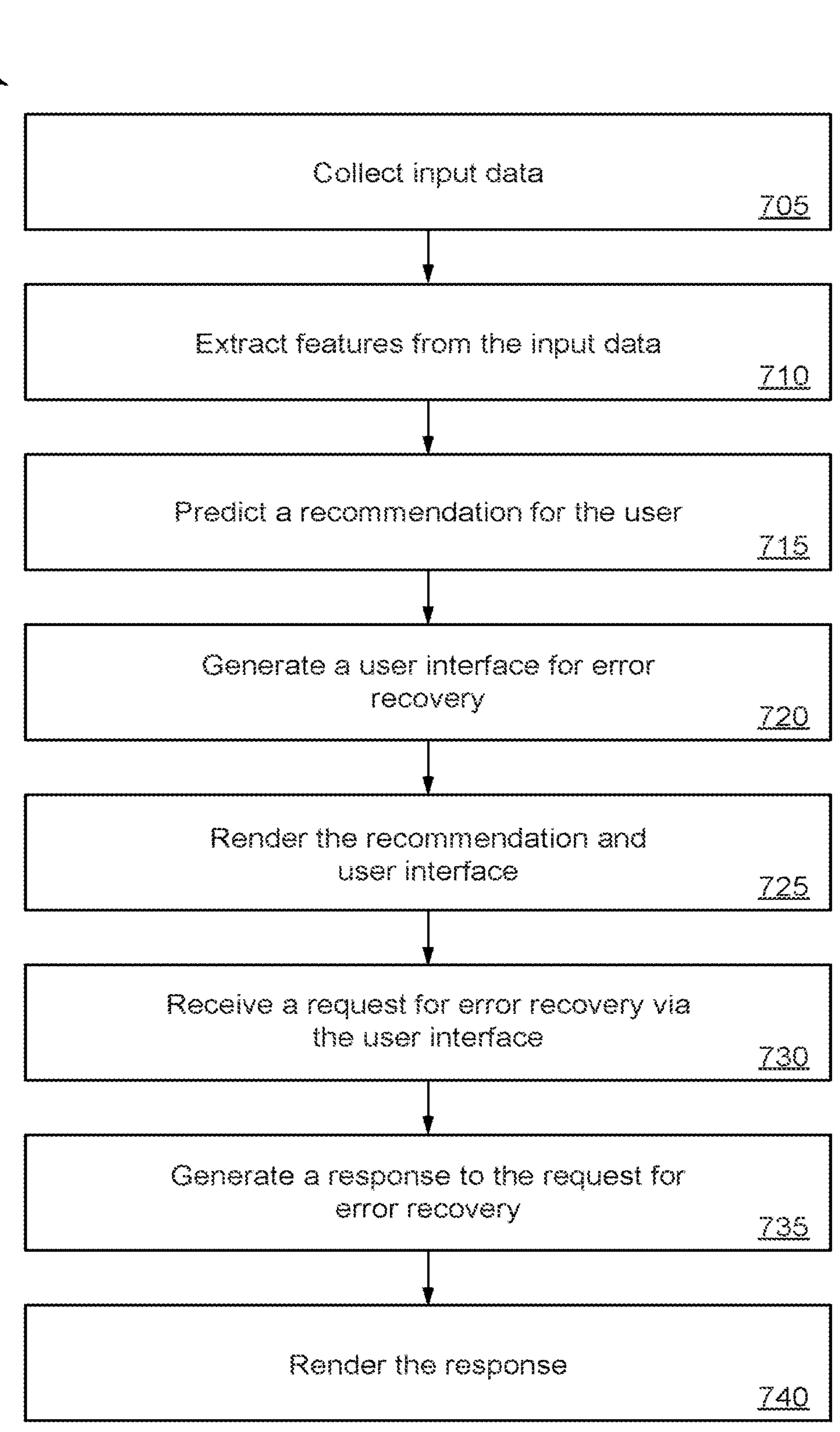
FIG. 7 is an illustration of a flowchart of an example process for error recovery in accordance with various embodiments.

FIG. 7 is a flowchart illustrating a process 700 for recovering from an error in prediction according to various embodiments. The processing depicted in FIG. 7 may be implemented in software (e.g., code, instructions, program) executed by one or more processing units (e.g., processors, cores) of the respective systems, hardware, or combinations thereof. The software may be stored on one or more non-transitory computer-readable media (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as in an embodiment depicted in FIG. 1, 2A, 2B, 3A, 3B, 4A, 4B, 4C, 5, or 6A-6C, the processing depicted in FIG. 7 may be performed by an artificial intelligence platform or system that facilitates predictions and error recovery from inaccurate predictions.

At block 705, input data is collected from a client system of a user (e.g., captured using one or more sensors). In some instances, the one or more sensors capture input data including images of a visual field of the first user wearing a head-mounted device comprising a display to display content to the user. The input data includes: (i) data regarding activity of the user in an extended reality environment (e.g., images and audio of the user interacting in the physical environment and/or the virtual environment), (ii) data from external systems, or (iii) both. In some instances, the data regarding activity of the user includes text, audio, images or video, sensor data, or the like. The input data may be obtained by a client system that comprises at least a portion of the virtual assistant. In certain instances, the client system is an HMD as described in detail herein.

At block 710, features are extracted from the input data. The features include: (i) one or more conditions, (ii) one or more actions, (iii) connections between the one or more events, conditions, and actions, or (iv) any combination thereof. In some instances, embeddings are generated for the features. The embeddings are vector representations of the features, and each item in a vector represents a feature or combination of features extracted from the input data.

At block 715, a recommendation is predicted for the user based on the features (or the embeddings of the features) and model parameters learned from historical activities performed by one or more users.

At block 720, a user interface (e.g., a graphical user interface) is generated. The user interface comprises one or more graphical user interface elements configured to enable the user to recovery from the recommendation when the recommendation is inaccurate. The one or more graphical user interface elements provide selectable options including an option to generate a new recommendation, modify the recommendation, or a combination thereof. In some instances, the user interface is generated based on preferences of the user. In other instances, the user interface is generated based on confidence of the recommendation and one or more confidence thresholds.

At block 725, the recommendation and the user interface are rendered on the display. In some instances, the recommendation is rendered within the user interface. In other instances, the recommendation is rendered separate from the user interface.

At block 730, a request is received from the user via the user interface to recovery from the inaccurate recommendation. The request includes selection of the option to generate the new recommendation, modify the recommendation, or the combination thereof.

At block 735, a response is generated based on the received request from the user. The response includes the new recommendation, a modified recommendation, or a combination thereof. In some instances, the request and response are used to update the model parameters.

At block 740, the response to the user is rendered on the display. In some instances, the response is rendered within the user interface. In other instances, the response is rendered separate from the user interface.

In some instances, the one or more graphical user interface elements are configured to request refreshing the recommendation by making a prediction of the new recommendation based on updated input data, the request includes selection of the option to generate the new recommendation, and in response to receiving the request for the refreshing, the processing further comprises: collecting, using the one or more cameras, the updated input data from the user that includes characteristics of updated activities performed by the user; extracting updated features from the updated input data, wherein the updated features include: (i) one or more conditions, (ii) one or more actions, (iii) connections between the one or more events, conditions, and actions, or (iv) any combination thereof; predicting the new recommendation for the user based on the updated features and the model parameters; and rendering the new recommendation on the display.

In some instances, the one or more graphical user interface elements are configured to request modifying the recommendation, the request includes selection of the option to modify the recommendation and an alternative recommendation, and in response to receiving the request for the modifying, the processing further comprises: rendering the alternative recommendation on the display.

In some instances, the one or more graphical user interface elements are configured to request modifying and refreshing the recommendation by making a prediction of the new recommendation based on explicit input data, the request includes selection of the option to modify and refresh the recommendation, and in response to receiving the request for the modifying and refreshing, the processing further comprises: collecting, using the one or more cameras, the explicit input data from the user that includes characteristics of updated activities performed by the user that are performed explicit for generating a new recommendation; extracting explicit features from the explicit input data, wherein the explicit features include: (i) one or more conditions, (ii) one or more actions, (iii) connections between the one or more events, conditions, and actions, or (iv) any combination thereof; predicting the new recommendation for the user based on the explicit features and the model parameters; and rendering the new recommendation on the display.

In some instances, the processing further comprises in response to receiving the request for the modifying and refreshing, rendering one or more hints to the user on the display, wherein the one or more hints are generated as information to teach the user how they may improve the accuracy of the recommendation, and the explicit input data from the user is collected from the updated activities performed by the user based on the one or more hints.

Illustrative Device

FIG. 8 is an illustration of a portable electronic device 800. The portable electronic device 800 may be implemented in various configurations in order to provide various functionality to a user. For example, the portable electronic device 800 may be implemented as a wearable device (e.g., a head-mounted device, smart eyeglasses, smart watch, and smart clothing), communication device (e.g., a smart, cellular, mobile, wireless, portable, and/or radio telephone), home management device (e.g., a home automation controller, smart home controlling device, and smart appliances), a vehicular device (e.g., autonomous vehicle), and/or computing device (e.g., a tablet, phablet, notebook, and laptop computer; and a personal digital assistant). The foregoing implementations are not intended to be limiting and the portable electronic device 800 may be implemented as any kind of electronic or computing device that is configured to provide an extended reality system and fine-tune an AI platform using a part of all of the methods disclosed herein.

The portable electronic device 800 includes processing system 808, which includes one or more memories 810, one or more processors 812, and RAM 814. The one or more processors 812 can read one or more programs from the one or more memories 810 and execute them using RAM 814. The one or more processors 812 may be of any type including but not limited to a microprocessor, a microcontroller, a graphical processing unit, a digital signal processor, an ASIC, a FPGA, or any combination thereof. In some embodiments, the one or more processors 812 may include a plurality of cores, one or more coprocessors, and/or one or more layers of local cache memory. The one or more processors 812 can execute the one or more programs stored in the one or more memories 810 to perform operations as described herein including those described with respect to FIGS. 1-7.

The one or more memories 810 can be non-volatile and may include any type of memory device that retains stored information when powered off. Non-limiting examples of memory include electrically erasable and programmable read-only memory (EEPROM), flash memory, or any other type of non-volatile memory. At least one memory of the one or more memories 810 can include one or more non-transitory computer-readable media from which the one or more processors 812 can read instructions. A computer-readable storage medium can include electronic, optical, magnetic, or other storage devices capable of providing the one or more processors 812 with computer-readable instructions or other program code. Non-limiting examples of a computer-readable storage medium include magnetic disks, memory chips, read-only (ROM), RAM, an ASIC, a configured processor, optical storage, or any other medium from which a computer processor can read the instructions.

The portable electronic device 800 also includes one or more storage devices 818 configured to store data received by and/or generated by the portable electronic device 800. The one or more storage devices 818 may be removable storage devices, non-removable storage devices, or a combination thereof. Examples of removable storage and non-removable storage devices include magnetic disk devices such as flexible disk drives and HDDs, optical disk drives such as compact disk (CD) drives or digital versatile disk (DVD) drives, SSDs, and tape drives.

The portable electronic device 800 may also include other components that provide additional functionality. For example, camera circuitry 802 may be configured to capture images and video of a surrounding environment of the portable electronic device 800. Examples of camera circuitry 802 include digital or electronic cameras, light field cameras, three-dimensional (3D) cameras, image sensors, imaging arrays, and the like. Similarly, audio circuitry 822 may be configured to record sounds from a surrounding environment of the portable electronic device 800 and output sounds to a user of the portable electronic device 800. Examples of audio circuitry 822 include microphones, speakers, and other audio/sound transducers for receiving and outputting audio signals and other sounds. Display circuitry 806 may be configured to display images, video, and other content to a user of the portable electronic device 800 and receive input from the user of the portable electronic device 800. Examples of the display circuitry 806 may include a liquid crystal display (LCD), a light-emitting diode (LED) display, and a touchscreen display. Communications circuitry 804 may be configured to enable the portable electronic device 800 to communicate with various wired or wireless networks and other systems and devices. Examples of communications circuitry 804 include wireless communication modules and chips, wired communication modules and chips, chips for communicating over local area networks, wide area networks, cellular networks, satellite networks, fiber optic networks, and the like, systems on chips, and other circuitry that enables the portable electronic device 800 to send and receive data. Orientation detection circuitry 820 may be configured to determine an orientation and a posture for the portable electronic device 800 and/or a user of the portable electronic device 800. Examples of orientation detection circuitry 820 includes global positioning system (GPS) receivers, ultra-wideband (UWB) positioning devices, accelerometers, gyroscopes, motion sensors, tilt sensors, inclinometers, angular velocity sensors, gravity sensors, and inertial measurement units. Haptic circuitry 826 may be configured to provide haptic feedback to and receive haptic feedback from a user of the portable electronic device 800. Examples of haptic circuitry 826 include vibrators, actuators, haptic feedback devices, and other devices that generate vibrations and provide other haptic feedback to a user of the portable electronic device 800. Power circuitry 824 may be configured to provide power to the portable electronic device 800. Examples of power circuitry 824 include batteries, power supplies, charging circuits, solar panels, and other devices configured to receive power from a source external to the portable electronic device 800 and power the portable electronic device 800 with the received power.

The portable electronic device 800 may also include other input and output (I/O) components. Examples of such input components can include a mouse, a keyboard, a trackball, a touch pad, a touchscreen display, a stylus, data gloves, and the like. Examples of such output components can include holographic displays, 3D displays, projectors, and the like.

Additional Considerations

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A non-transitory computer readable storage medium including instructions that, when executed by a system comprising one or more processors that are in communication with a head-mounted device, cause the system to perform:

obtaining, via one or more sensors, input data including user activity data;

determining a recommendation for a user, wherein the recommendation is based on the input data and historical activity data of a plurality of users including the user;

generating a user interface (UI) including one or more selectable UI elements, wherein:

in accordance with a determination that the recommendation satisfies a first confidence threshold, a first set of selectable UI elements of the one or more selectable UI elements includes one or more of a first selectable UI element for generating a new recommendation, a second selectable UI element for modifying the recommendation, and a third selectable UI element for combination thereof, and in accordance with a determination that the recommendation satisfies a second confidence threshold, a second set of selectable UI elements of the one or more selectable UI elements includes, at least, the first selectable UI element for generating a new recommendation;

causing a display of the head-mounted device to present the UI and the recommendation, wherein the UI includes at least one of the first set of selectable UI elements or the second set of selectable UI elements;

detecting a user input selecting one of the first selectable UI element, the second selectable UI element, or the third selectable UI element from the UI;

generating, based on the user input, a response including one of a new recommendation, a modified recommendation, or a combination thereof; and causing the display of the head-mounted device to present the response via the UI.

2. The non-transitory computer readable storage medium of claim 1, wherein the instructions, when executed by the system, further cause the system to perform:

in response to another user input selecting the first selectable UI element, obtaining, via the one or more sensors, updated input data including updated user activity data;

determining another new recommendation for the user, wherein the other new recommendation is based on the updated input data and historical activity data of the plurality of users; and causing the display of the head-mounted device to present the UI and the other new recommendation.

3. The non-transitory computer readable storage medium of claim 1, wherein the instructions, when executed by the system, further cause the system to perform:

in response to a user input selecting the second selectable UI element, receiving one or more modification inputs:

selecting at least one conditional statement of a control structure, determining at least one action to be performed in response to at least one condition of the at least one conditional statement being satisfied, and arranging the at least one conditional statement of the control structure with the at least one action in a prescribed order;

generating the modified recommendation based on the modification inputs; and causing the display of the head-mounted device to present the UI and the modified recommendation.

4. The non-transitory computer readable storage medium of claim 1, wherein the instructions, when executed by the system, further cause the system to perform:

in response to detecting a user input selecting one of the first selectable UI element, the second selectable UI element, or the third selectable UI element from the UI, causing the display of the head-mounted device to present one or more hints, wherein:

the one or more hints are generated as information to teach the user how to improve the accuracy of the recommendation, and explicit input data from the user is collected from updated activities performed by the user based on the one or more hints.

5. The non-transitory computer readable storage medium of claim 1, wherein the instructions, when executed by the system, further cause the system to perform:

extracting features from the input data;

generating one or more embeddings based on the features; and wherein determining the recommendation for the user is further based on the one or more embeddings.

6. The non-transitory computer readable storage medium of claim 5, wherein the features include (i) one or more conditions, (ii) one or more actions, (iii) one or more events, or (iv) any combination thereof.

7. The non-transitory computer readable storage medium of claim 1, wherein the input data includes one or more of data regarding activity of the user in an extended reality environment and data from external systems.

8. A head-mounted device, comprising:

one or more sensors;

one or more displays;

one or more programs, wherein the one or more programs are stored in memory and configured to be executed by one or more processors, the one or more programs including instructions for:

obtaining, via the one or more sensors, input data including user activity data;

determining a recommendation for a user, wherein the recommendation is based on the input data and historical activity data of a plurality of users including the user;

generating a user interface (UI) including one or more selectable UI elements, wherein:

in accordance with a determination that the recommendation satisfies a first confidence threshold, a first set of selectable UI elements of the one or more selectable UI elements includes one or more of a first selectable UI element for generating a new recommendation, a second selectable UI element for modifying the recommendation, and a third selectable UI element for combination thereof, and in accordance with a determination that the recommendation satisfies a second confidence threshold, a second set of selectable UI elements of the one or more selectable UI elements includes, at least, the first selectable UI element for generating a new recommendation;

causing the one or more displays to present the UI and the recommendation, wherein the UI includes at least one of the first set of selectable UI elements or the second set of selectable UI elements;

detecting a user input selecting one of the first selectable UI element, the second selectable UI element, or the third selectable UI element from the UI;

generating, based on the user input, a response including one of a new recommendation, a modified recommendation, or a combination thereof; and causing the one or more displays to present the response via the UI.

9. The head-mounted device of claim 8, wherein the one or more programs further include instructions for:

in response to another user input selecting the first selectable UI element, obtaining, via the one or more sensors, updated input data including updated user activity data;

determining another new recommendation for the user, wherein the other new recommendation is based on the updated input data and historical activity data of the plurality of users; and causing the one or more displays to present the UI and the other new recommendation.

10. The head-mounted device of claim 8, wherein the one or more programs further include instructions for:

in response to a user input selecting the second selectable UI element, receiving one or more modification inputs:

selecting at least one conditional statement of a control structure, determining at least one action to be performed in response to at least one condition of the at least one conditional statement being satisfied, and arranging the at least one conditional statement of the control structure with the at least one action in a prescribed order;

generating the modified recommendation based on the modification inputs; and causing the one or more displays to present the UI and the modified recommendation.

11. The head-mounted device of claim 8, wherein the one or more programs further include instructions for:

in response to detecting a user input selecting one of the first selectable UI element, the second selectable UI element, or the third selectable UI element from the UI, causing the one or more displays to present one or more hints, wherein:

the one or more hints are generated as information to teach the user how to improve the accuracy of the recommendation, and explicit input data from the user is collected from updated activities performed by the user based on the one or more hints.

12. The head-mounted device of claim 8, wherein the one or more programs further include instructions for:

extracting features from the input data;

generating one or more embeddings based on the features; and wherein determining the recommendation for the user is further based on the one or more embeddings.

13. The head-mounted device of claim 12, wherein the features include (i) one or more conditions, (ii) one or more actions, (iii) one or more events, or (iv) any combination thereof.

14. The head-mounted device of claim 8, wherein the input data includes one or more of data regarding activity of the user in an extended reality environment and data from external systems.

15. A method, comprising:

obtaining, via one or more sensors, input data including user activity data;

determining a recommendation for a user, wherein the recommendation is based on the input data and historical activity data of a plurality of users including the user;

generating a user interface (UI) including one or more selectable UI elements, wherein:

in accordance with a determination that the recommendation satisfies a first confidence threshold, a first set of selectable UI elements of the one or more selectable UI elements includes one or more of a first selectable UI element for generating a new recommendation, a second selectable UI element for modifying the recommendation, and a third selectable UI element for combination thereof, and in accordance with a determination that the recommendation satisfies a second confidence threshold, a second set of selectable UI elements of the one or more selectable UI elements includes, at least, the first selectable UI element for generating a new recommendation;

causing a display of a head-mounted device to present the UI and the recommendation, wherein the UI includes at least one of the first set of selectable UI elements or the second set of selectable UI elements;

detecting a user input selecting one of the first selectable UI element, the second selectable UI element, or the third selectable UI element from the UI;

generating, based on the user input, a response including one of a new recommendation, a modified recommendation, or a combination thereof; and causing the display of the head-mounted device to present the response via the UI.

16. The method of claim 15, further comprising:

in response to another user input selecting the first selectable UI element, obtaining, via the one or more sensors, updated input data including updated user activity data;

determining another new recommendation for the user, wherein the other new recommendation is based on the updated input data and historical activity data of the plurality of users; and causing the display of the head-mounted device to present the UI and the other new recommendation.

17. The method of claim 15, further comprising:

in response to a user input selecting the second selectable UI element, receiving one or more modification inputs:

selecting at least one conditional statement of a control structure, determining at least one action to be performed in response to at least one condition of the at least one conditional statement being satisfied, and arranging the at least one conditional statement of the control structure with the at least one action in a prescribed order;

generating the modified recommendation based on the modification inputs; and causing the display of the head-mounted device to present the UI and the modified recommendation.

18. The non-transitory computer readable storage medium of claim 1, wherein the user input comprises a gaze at one of the first selectable UI element, the second selectable UI element, or the third selectable UI element from the UI.

19. The head-mounted device of claim 8, wherein the user input comprises a gaze at one of the first selectable UI element, the second selectable UI element, or the third selectable UI element from the UI.

20. The method of claim 15, wherein the user input comprises a gaze at one of the first selectable UI element, the second selectable UI element, or the third selectable UI element from the UI.

* * * * *